United States Patent
Sung et al.

(10) Patent No.: US 11,805,199 B2
(45) Date of Patent: Oct. 31, 2023

(54) ELECTRONIC DEVICE AND METHOD FOR IDENTIFYING GRIP STATE OF ELECTRONIC DEVICE

(71) Applicant: Samsung Electronics Co., Ltd., Suwon-si (KR)

(72) Inventors: Kicheol Sung, Suwon-si (KR); Sungwan Byun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/857,610

(22) Filed: Jul. 5, 2022

(65) Prior Publication Data

US 2023/0129250 A1    Apr. 27, 2023

Related U.S. Application Data

(63) Continuation of application No. PCT/KR2022/007995, filed on Jun. 7, 2022.

(30) Foreign Application Priority Data

Oct. 24, 2021 (KR) .................. 10-2021-0142285
Nov. 22, 2021 (KR) .................. 10-2021-0161794

(51) Int. Cl.
*H04M 1/72454* (2021.01)
*G01V 3/08* (2006.01)
*H04W 52/38* (2009.01)

(52) U.S. Cl.
CPC ........ *H04M 1/72454* (2021.01); *G01V 3/088* (2013.01); *H04W 52/38* (2013.01)

(58) Field of Classification Search
CPC ... H04M 1/72454; H04W 52/38; G01V 3/008
See application file for complete search history.

(56) References Cited

U.S. PATENT DOCUMENTS 8,253,706 B2 * 8/2012 Simmons ............ H03M 1/1245
                                                           345/173
9,425,846 B2 * 8/2016 Kim .................... H04B 1/3838
(Continued)

FOREIGN PATENT DOCUMENTS

DE    102009057960 B4 *  2/2014  ............. G01V 3/088
EP       2722988 A1 *  4/2014  ........... G06F 3/0416
(Continued)

OTHER PUBLICATIONS

International Search Report and written opinion dated Sep. 28, 2022, issued in International Application No. PCT/KR2022/007995.

*Primary Examiner* — Hai V Nguyen
(74) *Attorney, Agent, or Firm* — Jefferson IP Law, LLP

(57) ABSTRACT

An electronic device according to an embodiment include a first antenna, a second antenna, a first capacitor connected to the first antenna, a second capacitor connected to the second antenna, a grip sensor connected to the first antenna through a first electrical path and connected to the second antenna through a second electrical path and at least one processor, wherein at least one processor is configured to identify that a changed value of a first capacitance, caused by the first antenna, obtained through the grip sensor to identify whether the electronic device is gripped, is maintained within a specified range, based on identifying that the changed value of the first capacitance is maintained within the specified range, obtain a changed value of the second capacitance, caused by the second antenna, and based on the changed value of the second capacitance, identify whether the electronic device is gripped.

20 Claims, 14 Drawing Sheets

(56) References Cited

U.S. PATENT DOCUMENTS

| | | |
|---|---|---|
| 9,673,884 B2 | 6/2017 | Kang et al. |
| 9,692,439 B2 * | 6/2017 | Simmons .............. G06F 3/0446 |
| 9,748,667 B2 | 8/2017 | Nakamura |
| 9,753,070 B2 * | 9/2017 | Burger ............... G01R 27/2605 |
| 10,050,332 B2 * | 8/2018 | Kim ........................ H01Q 1/50 |
| 10,305,166 B2 | 5/2019 | Kim et al. |
| 10,447,263 B2 * | 10/2019 | Yang .................... G06F 1/1626 |
| 10,658,731 B2 | 5/2020 | Muhn |
| 10,782,827 B2 | 9/2020 | Seo et al. |
| 10,955,957 B2 * | 3/2021 | Lee ..................... G06F 3/04186 |
| 11,012,070 B2 * | 5/2021 | Yang ..................... H04B 5/0056 |
| 11,201,635 B2 * | 12/2021 | Chu ..................... H04B 17/102 |
| 11,418,230 B2 | 8/2022 | Noh et al. |
| 2010/0328226 A1 * | 12/2010 | Simmons ................ G06F 3/044 345/173 |
| 2012/0319995 A1 * | 12/2012 | Simmons ............. H03K 17/962 345/174 |
| 2015/0015279 A1 * | 1/2015 | Burger ................ H03K 17/962 324/679 |
| 2015/0301653 A1 * | 10/2015 | Urushi .................... G06F 3/044 345/174 |
| 2017/0102815 A1 * | 4/2017 | Portmann ............ H03K 17/962 |
| 2020/0136668 A1 * | 4/2020 | Chu ...................... G06F 1/1698 |
| 2021/0105350 A1 * | 4/2021 | Kim ..................... H04M 1/0214 |
| 2021/0185164 A1 * | 6/2021 | Jung ........................ H04B 1/50 |
| 2021/0391642 A1 | 12/2021 | Yoon et al. |
| 2022/0190827 A1 * | 6/2022 | Hüttenhofer ....... H03K 17/9627 |
| 2022/0261045 A1 * | 8/2022 | Park ..................... H03K 17/962 |
| 2023/0171708 A1 * | 6/2023 | Choi ........................ G06F 3/01 455/522 |

FOREIGN PATENT DOCUMENTS

| | | |
|---|---|---|
| JP | 2015213247 A | 11/2015 |
| KR | 10-2006-0073810 A | 6/2006 |
| KR | 10-2007-0114611 A | 12/2007 |
| KR | 10-2017-0019838 A | 2/2017 |
| KR | 10-2112353 B1 | 5/2020 |
| KR | 10-2123283 B1 | 6/2020 |
| KR | 10-2126995 B1 | 6/2020 |
| KR | 10-2020-0101253 A | 8/2020 |
| KR | 10-2021-0034994 A | 3/2021 |
| KR | 10-2021-0125346 A | 10/2021 |

* cited by examiner

ELECTRONIC DEVICE AND METHOD FOR IDENTIFYING GRIP STATE OF ELECTRONIC DEVICE

CROSS-REFERENCE TO RELATED APPLICATION(S)

This application is a continuation application, claiming priority under § 365(c), of an International application No. PCT/KR2022/007995, filed on Jun. 7, 2022, which is based on and claims the benefit of a Korean patent application number 10-2021-0142285, filed on Oct. 24, 2021, in the Korean Intellectual Property Office, and of a Korean patent application number 10-2021-0161794, filed on Nov. 22, 2021, in the Korean Intellectual Property Office, the disclosure of each of which is incorporated by reference herein in its entirety.

TECHNICAL FIELD

The disclosure relates to an electronic device and a method for identifying a grip state of an electronic device.

BACKGROUND ART

An electronic device may comprise a plurality of antennas for transmitting and receiving signals. At least part of the plurality of antennas may be connected to a grip sensor of the electronic device. The electronic device may identify whether the electronic device is gripped by a user using the grip sensor. An operation of determining whether the electronic device is gripped based on a changed value of capacitance caused by the first antenna may be difficult.

DISCLOSURE

Technical Problem

An electronic device may identify whether the electronic device is gripped based on a changed value of capacitance caused by a first antenna connected to the grip sensor. The first antenna may be sensitive to temperature. Accordingly, when the temperature of the electronic device is high or low, determining whether the electronic device is gripped based on a changed value of capacitance caused by the first antenna may be difficult.

Accordingly, an aspect of the disclosure is to provide a method and a device for determining whether the electronic device is gripped in a state in which the temperature of the electronic device is high or low will be proposed.

The technical problems to be achieved in this document are not limited to those described above, and other technical problems not mentioned herein will be clearly understood by those having ordinary knowledge in the art to which the disclosure belongs, from the following description.

Technical Solution

In accordance with an aspect of the disclosure, an electronic device is provided. The electronic device includes a first antenna, a second antenna, a first capacitor connected to the first antenna, a second capacitor connected to the second antenna, a grip sensor connected to the first antenna through a first electrical path and connected to the second antenna through a second electrical path and at least one processor operably coupled to the grip sensor, wherein at least one processor may be configured to identify that a changed value of a first capacitance, caused by the first antenna, obtained through the grip sensor to identify whether the electronic device is gripped, is maintained within a specified range, based on identifying that the changed value of the first capacitance is maintained within the specified range, obtain, through the grip sensor, a changed value of the second capacitance, caused by the second antenna, and based on the changed value of the second capacitance, identify whether the electronic device is gripped.

In accordance with another aspect of the disclosure, a method of an electronic device is provided. The method includes identifying that a changed value of a first capacitance, caused by a first antenna, connected with a grip sensor through a first electrical path, from among the first antenna and a second antenna connected with the grip sensor through a second electrical path, the changed value obtained through the grip sensor to, is maintained within a specified range, based on identifying that the changed value of the first capacitance is maintained within the specified range, obtaining, through the grip sensor, a changed value of a second capacitance, caused by the second antenna, and based on the changed value of the second capacitance, identifying whether the electronic device is gripped.

In accordance with another aspect of the disclosure, an electronic device is provided. The electronic device includes a first housing comprising a first surface, a second surface faced away from the first surface, a first side surface between the first surface and the second surface, and a second side surface between the first surface and the second surface, a second housing comprising a third surface, a fourth surface faced away from the third surface, a third side surface between the third surface and the fourth surface, and a fourth side surface between the third surface and the fourth surface, a third housing comprising a hinge structure rotatably connecting the first side surface of the first housing and the third side surface of the second housing faced to the first side surface of the first housing with respect to a folding axis of the hinge structure, a first antenna formed in at least part of the second side surface, a second antenna formed in at least part of the fourth side surface, a first capacitor connected with the first antenna, a second capacitor connected with the second antenna, at least one grip sensor, and at least one processor, operably coupled to the at least one grip sensor, wherein at least one processor may be configured to while identifying, based on a changed value of the first capacitance caused by the first antenna, whether the electronic device is gripped, identify that a state of the electronic device is switched from an unfolded state in which the first surface and the third surface form a flat surface to a folded state in which the first surface faces the third surface, based on identifying that the state of the electronic device is switched to the folded state, obtain through the at least one grip sensor, a changed value of a second capacitance caused by the second antenna, and based on the changed value of the second capacitance, identifying whether the electronic device is gripped.

Advantageous Effects

According to an embodiment, the electronic device can identify whether the electronic device is gripped based on a changed value of capacitance caused by at least one among the first antenna and the second antenna. The electronic device can identify that the changed value of the first capacitance caused by the first antenna is maintained within a specified range. The electronic device can identify that the temperature of the electronic device is outside the specified temperature range based on identifying that the changed value of the first capacitance is maintained within a specified range. Based on identifying that the changed value of the first capacitance is maintained within a specified range, the electronic device can identify whether the electronic device is gripped based on the changed value of the second capacitance.

The effects that can be obtained from the disclosure are not limited to those described above, and any other effects not mentioned herein will be clearly understood by those having ordinary knowledge in the art to which the disclosure belongs, from the following description.

MODE FOR INVENTION

Figure 1A:
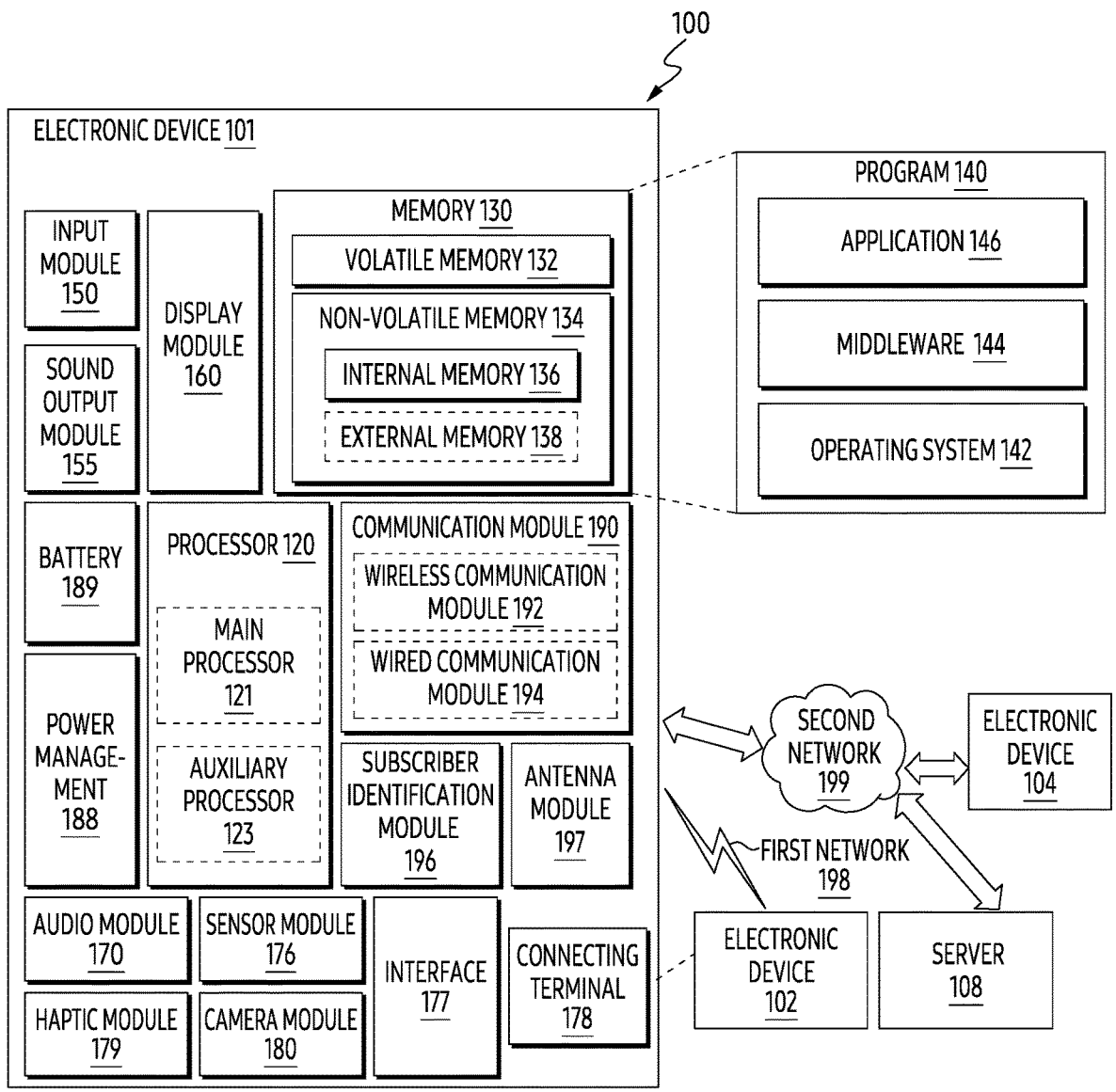
FIG. 1A is a block diagram of an electronic device in a network environment according to an embodiment of the disclosure.

FIG. 1A is a block diagram illustrating an electronic device 101 in a network environment 100 according to an embodiment of the disclosure.

Referring to FIG. 1A, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 of 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 1B:
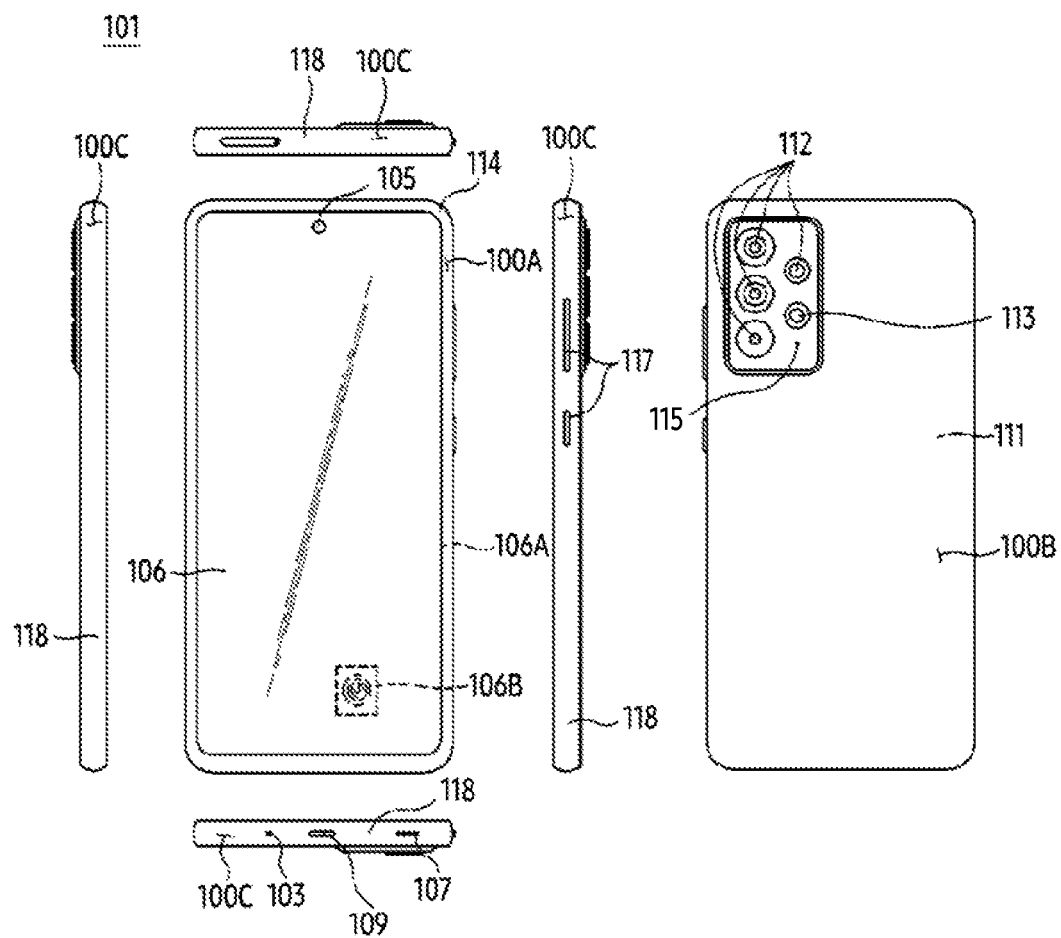
FIG. 1B is a diagram illustrating an electronic device according to an embodiment of the disclosure.

FIG. 1B is a diagram illustrating an electronic device according to an embodiment of the disclosure.

Referring to FIG. 1B, the electronic device 101 according to an embodiment may comprise a housing forming an exterior of the electronic device 101. For example, the housing may comprise a first surface (or front surface) 100A, a second surface (or rear surface) 100B, and a third surface (or side surface) 100C surrounding a space between the first surface 100A and the second surface 100B. In an embodiment, the housing may refer to a structure (e.g., the frame structure 110 of FIG. 1C) forming at least part of the first surface 100A, the second surface 100B, and/or the third surface 100C.

The electronic device 101 according to an embodiment may comprise a substantially transparent front plate 114. In an embodiment, the front plate 114 may form at least a part of the first surface 100A. In an embodiment, the front plate 114 may comprise, for example, a glass plate including various coating layers or a polymer plate but is not limited thereto.

The electronic device 101 according to an embodiment may comprise a substantially opaque rear plate 111. In an embodiment, the rear plate 111 may form at least a part of the second surface 100B. In an embodiment, the rear plate 111 may be formed by coated or colored glass, ceramic, polymers, metals (e.g., aluminum, stainless steel (STS), or magnesium), or a combination of at least two of the materials.

Figure 1C:
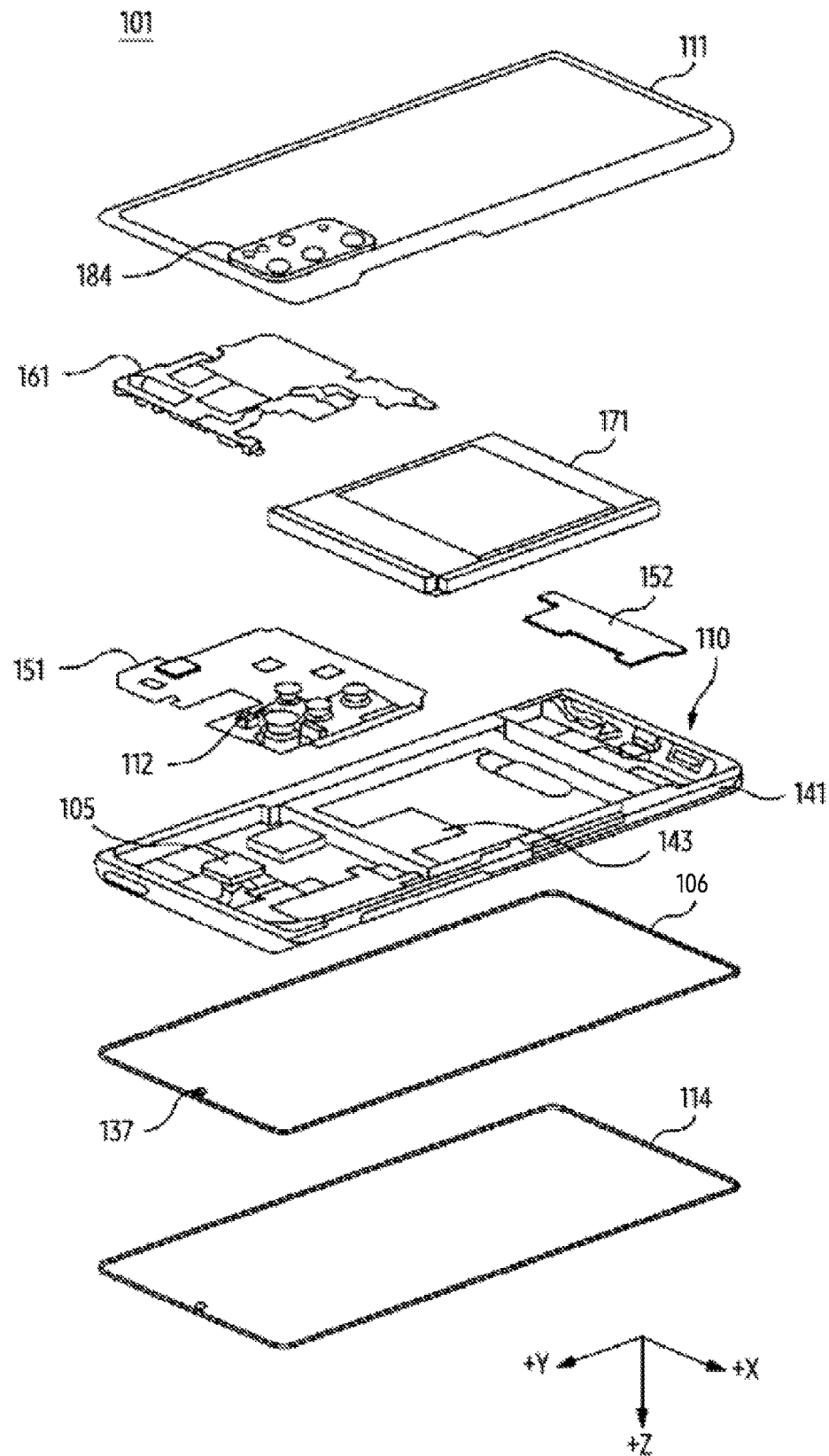
FIG. 1C is an exploded perspective view of an electronic device according to an embodiment of the disclosure.

The electronic device 101 according to an embodiment may comprise a side bezel structure (or a side member) 118 (e.g., a sidewall 141 of the frame structure 110 of FIG. 1C). In an embodiment, the side bezel structure 118 may be coupled to the front plate 114 and/or the rear plate 111 to form at least a part of the third surface 100C of the electronic device 101. For example, the side bezel structure 118 may form the entire third surface 100C of the electronic device 101, and for another example, the side bezel structure 118 may form the third surface 100C of the electronic device 101 together with the front plate 114 and/or the rear plate 111.

Unlike the illustrated embodiment, when the third surface 100C of the electronic device 101 is partially formed by the front plate 114 and/or the rear plate 111, the front plate 114 and/or the rear plate 111 may comprise a region that is seamlessly extended by bending toward the rear plate 111 and/or the front plate 114 from an edge thereof. The extending regions of the front plate 114 and/or the rear plate 111 may be positioned at both ends of, for example, the long edges of the electronic device 101, but are not limited by the above-described examples.

In an embodiment, the side bezel structure 118 may comprise a metal and/or a polymer. In an embodiment, the rear plate 111 and the side bezel structure 118 may be integrally formed and may comprise the same material (e.g., a metal material such as aluminum), but are not limited thereto. For example, the rear plate 111 and the side bezel structure 118 may be formed in separate configurations and/or may contain different materials.

In an embodiment, the electronic device 101 may comprise at least one of a display 106, an audio module 103, 115, and 107, a sensor module (not shown), camera modules 105, 112, 113, a key input device 117, a light emitting device (not shown), and/or a connector hole 109. In another embodiment, the electronic device 101 may omit at least one of the components (e.g., a key input device 117 or a light emitting device (not shown)) or may further comprise other components.

In an embodiment, the display 106 (e.g., the display module 160 of FIG. 1A) may be visually exposed through a substantial part of the front plate 114. For example, at least a part of the display 106 may be visible through the front plate 114 forming the first surface 100A. In an embodiment, the display 106 may be disposed on the rear surface of the front plate 114.

In an embodiment, the outer shape of the display 106 may be formed to be generally same as the outer shape of the front plate 114 adjacent to the display 106. In an embodiment, in order to expand an area in which the display 106 is visually exposed, an interval between the outside of the display 106 and the outside of the front plate 114 may be formed to be substantially the same.

In an embodiment, the display 106 (or the first surface 100A of the electronic device 101) may comprise a screen display area 106A. In an embodiment, the display 106 may provide visual information to a user through the screen display area 106A. In the illustrated embodiment, when the first surface 100A is viewed from the front, the screen display area 106A is spaced apart from the outside of the first surface 100A and is positioned inside the first surface 100A but is not limited thereto. In another embodiment, when the first surface 100A is viewed forward, at least a part of the edge of the screen display area 106A may substantially coincide with the edge of the first surface 100A (or the front plate 114).

In an embodiment, the screen display area 106A may comprise a sensing area 106B configured to obtain biometric information of a user. Herein, the meaning of "the screen display area 106A comprises the sensing area 106B" may be understood as that at least a part of the sensing area 106B may be overlapped the screen display area 106A. For example, the sensing area 106B, like other areas of the screen display area 106A, may indicate an area in which visual information may be displayed by the display 106 and biometric information (e.g., fingerprint) of the user may be additionally obtained. In another embodiment, the sensing area 106B may be formed in the key input device 117.

In an embodiment, the display 106 may comprise a region in which the first camera module 105 (e.g., the camera module 180 of FIG. 1A) is located. In an embodiment, an opening is formed in the region of the display 106, and the first camera module 105 (e.g., a punch hole camera) may be at least partially disposed in the opening to face the first surface 100A. In this case, the screen display area 106A may surround at least a part of an edge of the opening. In another embodiment, the first camera module 105 (e.g., an under display camera (UDC)) may be disposed under the display 106 to overlap the area of the display 106. In this case, the display 106 may provide visual information to the user through the area, and additionally, the first camera module 105 may obtain an image corresponding to a direction toward the first surface 100A through the area of the display 106.

In an embodiment, the display 106 may be coupled with or disposed adjacent to a touch sensing circuit, pressure sensor capable of measuring the intensity (pressure) of the touch, and/or a digitizer that detects a magnetic field type stylus pen.

In an embodiment, the audio modules 103, 115, and 107 (e.g., the audio module 170 of FIG. 1A) may comprise microphone holes 103 and 115 and speaker holes 107.

In an embodiment, the microphone holes 103 and 115 may comprise a first microphone hole 103 formed in a partial region of the third surface 100C and a second microphone hole 115 formed in a partial region of the second surface 100B. A microphone (not shown) for obtaining an external sound may be disposed inside the microphone holes 103 and 115. The microphone may comprise a plurality of microphones to detect the direction of sound.

In an embodiment, the second microphone hole 115 formed in a partial region of the second surface 100B may be disposed adjacent to the camera modules 105, 112, and 113. For example, the second microphone hole 115 may obtain sound according to operations of the camera modules 105, 112, and 113. However, it is not limited thereto.

In an embodiment, the speaker hole 107 may comprise an external speaker hole 107 and a receiver hole (not shown) for a call. The external speaker hole 107 may be formed in a part of the third surface 100C of the electronic device 101. In another embodiment, the external speaker hole 107 may be implemented as one hole with the microphone hole 103. Although not shown, a receiver hole (not shown) for a call may be formed in the other part of the third surface 100C. For example, based on the illustration in FIG. 1B, the external speaker hole 107 may be formed on the third surface 100C corresponding to the lower end of the electronic device 101, and the receiver hole for a call may be formed on the third surface 100C corresponding to the upper end of the electronic device 101. However, it is not limited thereto, and in another embodiment, the receiver hole for a call may be formed at a position other than the third surface 100C. For example, the receiver hole for a call may be formed by a spaced apart space between the front plate 114 (or the display 106) and the side bezel structure 118.

In an embodiment, the electronic device 101 may comprise at least one speaker (not shown) configured to output sound to the outside of the housing through an external speaker hole 107 and/or a receiver hole for a call (not shown).

In an embodiment, the sensor module (not shown) (e.g., the sensor module 176 of FIG. 1A) may generate an electrical signal or data value corresponding to an internal operation state or an external environmental state of the electronic device 101. For example, the sensor module may comprise at least one of a proximity sensor, an HRM sensor, a fingerprint sensor, a gesture sensor, a gyro sensor, an atmospheric pressure sensor, a magnetic sensor, an acceleration sensor, grip sensors, color sensors, infrared (IR) sensors, biometric sensors, temperature sensors, humidity sensors and an illumination sensor.

In an embodiment, the camera modules 105, 112, and 113 (e.g., the camera module 180 of FIG. 1A) may comprise a first camera module 105 disposed to face the first surface 100A of the electronic device 101, a second camera module 112 disposed to face the second surface 100B and a flash 113.

In an embodiment, the second camera module 112 may comprise a plurality of cameras (e.g., a dual camera, a triple camera, or a quad camera). However, the second camera module 112 is not necessarily limited to including a plurality of cameras and may comprise single camera.

In an embodiment, the first camera module 105 and the second camera module 112 may comprise one or more lenses, an image sensor, and/or an image signal processor.

In an embodiment, the flash 113 may include, for example, a light emitting diode or a xenon lamp. In another embodiment, two or more lenses (infrared cameras, wide-angle and telephoto lenses) and image sensors may be disposed on one side of the electronic device 101.

In an embodiment, the key input device 117 (e.g., the input module 150 of FIG. 1A) may be disposed on the third surface 100C of the electronic device 101. In another embodiment, the electronic device 101 may not comprise some or all of the key input devices 117, and the key input device 117 that is not included may be implemented on the display 106 in another form such as a soft key.

In an embodiment, the connector hole 109 may be formed on the third surface 100C of the electronic device 101 to accommodate a connector of the external device. A connection terminal (e.g., the connection terminal 178 of FIG. 1A) electrically connected to a connector of an external device may be disposed in the connector hole 109. The electronic device 101 according to an embodiment may comprise an interface module (e.g., the interface 177 of FIG. 1A) for processing an electrical signal transmitted/received through the connection terminal.

In an embodiment, the electronic device 101 may comprise a light emitting device (not shown). For example, the light emitting device (not shown) may be disposed on the first surface 100A of the housing. The light emitting device (not shown) may provide state information of the electronic device 101 in the form of light. In another embodiment, the light emitting device (not shown) may provide a light source interlocked with an operation of the first camera module 105. In another embodiment, the light emitting device (not shown) may provide a light source interlocked with an operation of the first camera module 105. For example, the light emitting device (not shown) may comprise an LED, an IR LED, and/or a xenon lamp.

FIG. 1C is an exploded perspective view of an electronic device according to an embodiment of the disclosure.

Hereinafter, an overlapping description of a configuration having the same reference code as the above-described configuration will be omitted.

Referring to FIG. 1C, the electronic device 101 according to an embodiment may comprise a frame structure 110, a first printed circuit board 151, a second printed circuit board 152, a cover plate 161, and a battery 171.

In an embodiment, the frame structure 110 may comprise a sidewall 141 forming an outer appearance (e.g., the third surface 100C of FIG. 1B) of the electronic device 101 and a support part 143 extending inward from the sidewall 141. In an embodiment, the frame structure 110 may be disposed between the display 106 and the rear plate 111. In an embodiment, the sidewall 141 of the frame structure 110 may surround a space between the rear plate 111 and the front plate 114 (and/or the display 106), and the support part 143 of the frame structure 110 may extend from the sidewall 141 in the space.

In an embodiment, the frame structure 110 may support or accommodate other components included in the electronic device 101. For example, the display 106 may be disposed on one surface of the frame structure 110 facing in one direction (e.g., the +z direction), and the display 106 may be supported by the support part 143 of the frame structure 110. For another example, the first printed circuit board 151, the second printed circuit board 152, the battery 171, and the second camera module 112 may be disposed on the other surface facing in the direction (e.g., the −z direction) opposite to the one direction of the frame structure 110. The first printed circuit board 151, the second printed circuit board 152, the battery 171, and the second camera module 112 may be seated in recesses defined by the sidewall 141 and/or the support part 143 of the frame structure 110.

In an embodiment, the first printed circuit board 151, the second printed circuit board 152, and the battery 171 may be coupled to the frame structure 110, respectively. For example, the first printed circuit board 151 and the second printed circuit board 152 may be fixedly disposed in the frame structure 110 through a coupling member such as a screw. For example, the battery 171 may be fixedly disposed in the frame structure 110 through an adhesive member (e.g., a double-sided tape). However, it is not limited by the above examples.

In an embodiment, the cover plate 161 may be disposed between the first printed circuit board 151 and the rear plate 111. In an embodiment, a cover plate 161 may be disposed on the first printed circuit board 151. For example, the cover plate 161 may be disposed on a surface facing the −z direction of the first printed circuit board 151.

In an embodiment, the cover plate 161 may at least partially overlap the first printed circuit board 151 with respect to the z-axis. In an embodiment, the cover plate 161 may cover at least a partial area of the first printed circuit board 151. Through this, the cover plate 161 may protect the first printed circuit board 151 from physical impact or prevent separation of a connector (e.g., the connecting terminal 178 of FIG. 1A) coupled to the first printed circuit board 151.

In an embodiment, the cover plate 161 may be fixedly disposed on the first printed circuit board 151 through a coupling member (e.g., a screw), or may be coupled to the frame structure 110 together with the first printed circuit board 151 through the coupling member.

In an embodiment, the display 106 may be disposed between the frame structure 110 and the front plate 114. For example, the front plate 114 may be disposed on one side (e.g., in the +z direction) of the display 106, and the frame structure 110 may be disposed on the other side (e.g., in the −z direction).

In an embodiment, the front plate 114 may be coupled to the display 106. For example, the front plate 114 and the display 106 may be adhered to each other through an optical adhesive member (e.g., optically clear adhesive (OCA) or optically clear resin (OCR)) interposed therebetween.

In an embodiment, the front plate 114 may be coupled to the frame structure 110. For example, the front plate 114 may comprise an outer part extending outward from the display 106 when viewed in the z-axis direction and may be adhered to the frame structure 110 through an adhesive member (e.g., a double-sided tape) disposed between the outer part of the front plate 114 and the frame structure 110 (e.g., the sidewall 141). However, it is not limited by the above-described example.

In an embodiment, a processor (e.g., the processor 120 of FIG. 1A), a memory (e.g., the memory 130 of FIG. 1A), and/or an interface (e.g., the interface 177 of FIG. 1A) may be mounted on the first printed circuit board 151 and/or the second printed circuit board 152. The processor may include, for example, one or more of a central processing unit, an application processor, a graphic processing unit, an image signal processor, a sensor hub processor, and a communication processor. The memory may include, for example, a volatile memory or a non-volatile memory. The interface may include, for example, a high definition multimedia interface (HDMI), a universal serial bus (USB) interface, an SD card interface, and/or an audio interface. The interface may electrically or physically connect the electronic device 101 to an external electronic device, and may comprise a USB connector, an SD card/MMC connector, or an audio connector. In an embodiment, the first printed circuit board 151 and the second printed circuit board 152 may be operatively or electrically coupled to each other through a connection member (e.g., a flexible printed circuit board).

In an embodiment, the battery 171 (e.g., the battery 189 of FIG. 1A) may supply power to at least one component of the electronic device 101. For example, the battery 171 may comprise a rechargeable secondary battery or a fuel cell. At least a part of the battery 171 may be disposed on substantially the same plane as the first printed circuit board 151 and/or the second printed circuit board 152.

The electronic device 101 according to an embodiment may comprise an antenna module (not shown) (e.g., the antenna module 197 of FIG. 1A). In an embodiment, the antenna module may be disposed between the rear plate 111 and the battery 171. The antenna module may include, for example, a near field communication (NFC) antenna, a wireless charging antenna, and/or a magnetic secure transmission (MST) antenna. The antenna module may perform short-range communication with an external device, for example, or wirelessly transmit and receive power to and from the external device.

In an embodiment, the first camera module 105 (e.g., the front camera) may be disposed on at least a part (e.g., the support part 143) of the frame structure 110 such that the lens may receive external light through a part area (e.g., camera area 137) of the front plate 114 (e.g., the front surface 100A of FIG. 1B).

In an embodiment, the second camera module 112 (e.g., a rear camera) may be disposed between the frame structure 110 and the rear plate 111. In an embodiment, the second camera module 112 may be electrically connected to the first printed circuit board 151 through a connection member (e.g., a connector). In an embodiment, the second camera module 112 may be disposed such that the lens may receive external light through the camera area 184 of the rear plate 111 of the electronic device 101.

In an embodiment, the camera area 184 may be formed on a surface (e.g., the rear surface 100B of FIG. 1B) of the rear plate 111. In an embodiment, the camera area 184 may be formed at least partially transparent so that external light may be incident on the lens of the second camera module 112. In an embodiment, at least a part of the camera area 184 may protrude from the surface of the rear plate 111 to a predetermined height. However, it is not limited thereto, and in other embodiments, the camera area 184 may form substantially the same plane as the surface of the rear plate 111.

In an embodiment, the housing of the electronic device 101 may mean a configuration or structure that forms at least a part of the exterior of the electronic device 101. In this respect, at least a part of the front plate 114, the frame structure 110, and/or the rear plate 111 forming the appearance of the electronic device 101 may be referred to as a housing of the electronic device 101.

According to an embodiment, the electronic device (e.g., the electronic device 101 of FIG. 1A) may identify whether the electronic device is gripped from a user of the electronic device. For example, the electronic device may identify whether the electronic device is gripped based on the capacitance of the first capacitor connected to the first antenna. In high or low temperature situations, the first antenna may be unsuitable for identifying whether the electronic device is gripped since the first antenna is sensitive to temperature changes. Accordingly, the electronic device may change an antenna for identifying whether the electronic device is gripped. The electronic device may identify whether the electronic device is gripped based on the capacitance of the second capacitor connected to the second antenna.

The operation of the electronic device (or the processor of the electronic device) for the above-described embodiment may be described below. The electronic device described below may correspond to the electronic device 101 of FIG. 1A.

Figure 2:
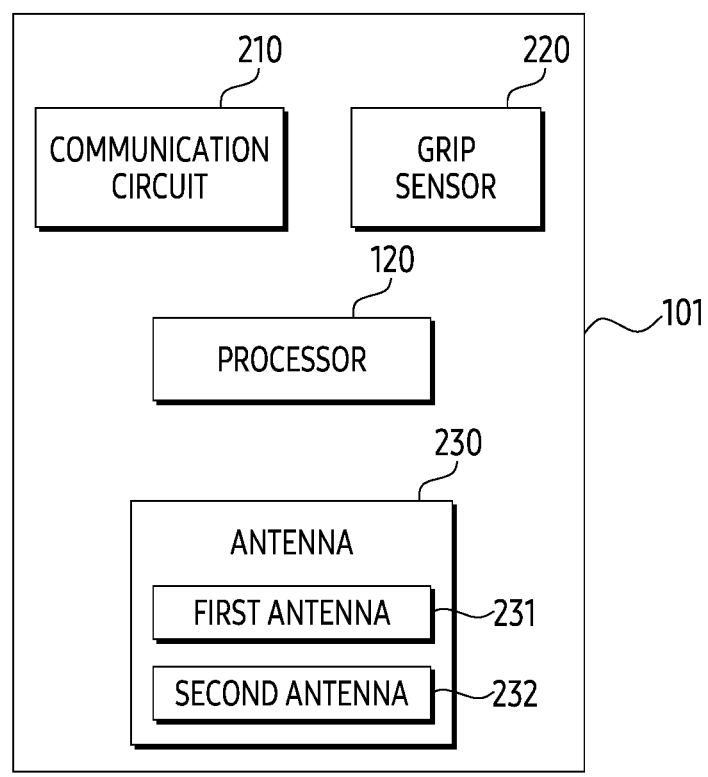
FIG. 2 is a simplified block diagram of an electronic device according to an embodiment of the disclosure.

FIG. 2 is a simplified block diagram of an electronic device according to an embodiment of the disclosure.

Referring to FIG. 2, the electronic device 101 of FIG. 2 may correspond to the electronic device 101 of FIG. 1A. The electronic device 101 may comprise a processor 120, a communication circuit 210, a grip sensor 220, and/or an antenna 230. According to an embodiment, the electronic device 101 may comprise at least one of a processor 120, a communication circuit 210, a grip sensor 220, and an antenna 230. For example, at least part of the processor 120, the communication circuit 210, the grip sensor 220, and the antenna 230 may be omitted according to an embodiment.

According to an embodiment, the processor 120 may correspond to the processor 120 of FIG. 1A. The processor 120 may be operatively coupled with or connected with the communication circuit 210 and the grip sensor 220. The processor 120 may be configured with at least one processor. The processor 120 may comprise at least one processor.

According to an embodiment, the processor 120 may comprise a hardware component for processing data based on one or more instructions. For example, the hardware components for processing data may comprise Arithmetic and Logic Unit (ALU), Field Programmable Gate Array (FPGA) and/or Central Processing Unit (CPU). According to an embodiment, the processor 120 may comprise a sensor hub processor that is an example of the auxiliary processor 123 of FIG. 1A.

According to an embodiment, the electronic device 101 may comprise a communication circuit 210. For example, the communication circuit 210 may correspond to the communication module 190 of FIG. 1A. For example, the communication circuit 210 may be used for various radio access technologies (RAT).

For example, the communication circuit 210 may be connected to the antenna 230. The communication circuit 210 may be used to transmit and/or receive a signal through the antenna 230. The processor 120 may transmit and/or receive a signal through the antenna 230 using the communication circuit 210.

For example, the communication circuit 210 may comprise components for processing a signal transmitted through the antenna 230 or a signal received through the antenna 230. For example, the communication circuit 210 may comprise at least one of a radio frequency front end (RFFE), at least one filter, at least one power amplifier (PA), at least one switch, and a duplexer.

According to an embodiment, the electronic device 101 may comprise a grip sensor 220. For example, the grip sensor 220 may correspond to the sensor module 176 of FIG. 1A. For example, the grip sensor 220 may be used to identify whether the electronic device 101 is gripped by a user. The grip sensor 220 may be connected to the antenna 230. The grip sensor 220 may identify whether the electronic device 101 is gripped by the user based on a changed value in capacitance of the capacitor connected to the antenna 230. The grip sensor 220 may comprise at least one grip sensor. The grip sensor 220 may be configured with at least one grip sensor.

According to an embodiment, the electronic device 101 may comprise an antenna 230. For example, the antenna 230 may correspond to the antenna module 197 of FIG. 1A.

According to an embodiment, the antenna 230 may comprise a first antenna 231 and a second antenna 232. The first antenna 231 may be connected to the grip sensor 220 through a first electrical path. The second antenna 232 may be connected to the grip sensor 220 through a second electrical path. For example, the second electrical path may be distinguished from the first electrical path. A detailed example of a configuration in which the first antenna 231 is connected to the grip sensor 220 through a first electrical path and the second antenna 232 is connected to the grip sensor 220 through a second electrical path may be described with reference to FIG. 3.

Figure 3:
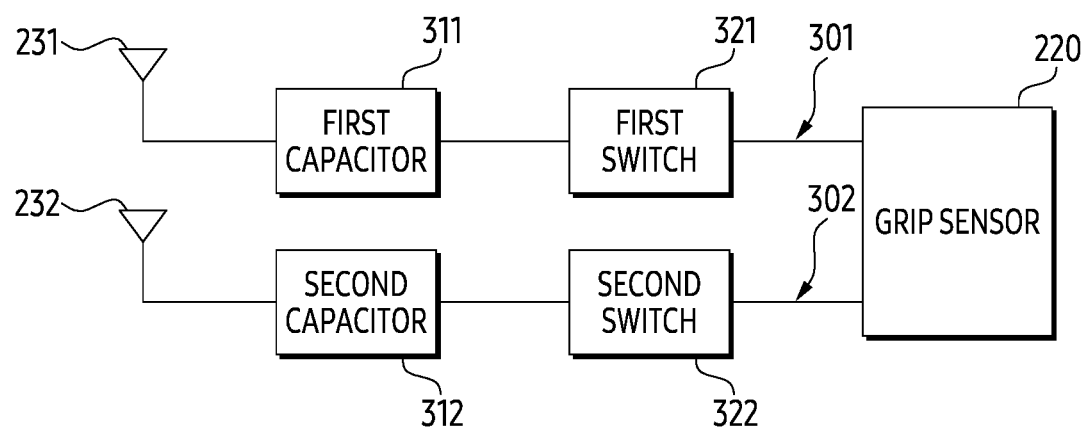
FIG. 3 illustrates an example of a configuration in which a first antenna and a second antenna are connected to a grip sensor according to an embodiment of the disclosure.

FIG. 3 illustrates an example of a configuration in which a first antenna and a second antenna are connected to a grip sensor according to an embodiment of the disclosure.

Referring to FIG. 3, the first antenna 231 may be connected to the grip sensor 220 through a first electrical path 301. In the first electrical path 301, a first capacitor 311 and a first switch 321 may be further included between the first antenna 231 and the grip sensor 220. For example, the first antenna 231 may be connected to the first capacitor 311. The first capacitor 311 may be connected to the first switch 321. The first switch 321 may be connected to the grip sensor 220.

The second antenna 232 may be connected to the grip sensor 220 through the second electrical path 302. In the second electrical path 302, a second capacitor 312 and a second switch 322 may be further included between the second antenna 232 and the grip sensor 220. For example, the second antenna 232 may be connected to the second capacitor 312. The second capacitor 312 may be connected to the second switch 322. The second switch 322 may be connected to the grip sensor 220.

For example, the grip sensor 220 (or the grip sensor 220 controlled by the processor 120) may identify the first capacitance of the first capacitor 311. The first capacitance may be changed based on an external object (e.g., a user) contacting the first antenna 231. The grip sensor 220 may identify whether the electronic device 101 is gripped by the user based on the changed value of the first capacitance.

For example, although not shown, the first switch 321 may be controlled by the processor 120 (or at least one of the communication circuit 210 and the grip sensor 220 controlled by the processor 120). The processor 120 may block or maintain the first electrical path by controlling the first switch 321. The processor 120 may cease an operation in which the grip sensor 220 identifies whether the electronic device 101 is gripped based on the first capacitance by controlling the first switch 321.

For example, the grip sensor 220 (or the grip sensor 220 controlled by the processor 120) may identify the second capacitance of the second capacitor 312. The second capacitance may be changed based on an external object (e.g., a user) contacting the second antenna 232. The grip sensor 220 may identify whether the electronic device 101 is gripped by the user based on the changed value of the second capacitance.

For example, although not shown, the second switch 322 may be controlled by the processor 120 (or at least one of the communication circuit 210 and the grip sensor 220 controlled by the processor 120). The processor 120 may block or maintain the second electrical path by controlling the first switch 321. The processor 120 may cease an operation in which the grip sensor 220 identifies whether the electronic device 101 is gripped based on the second capacitance by controlling the second switch 322.

According to an embodiment, the first electrical path 301 and the second electrical path 302 may be configured in different types. For example, the first electrical path may be formed based on flexible printed circuit board (FPCB) radio frequency (RF) cable (FRC). For example, the first electrical path 301 may be formed of an FRC. For another example, the second electrical path may be formed based on a conductor (or metal) formed on a substrate (e.g., a PCB).

According to an embodiment, the first antenna 231 and the second antenna 232 may be located at an upper end of the electronic device 101. For example, the first antenna 231 and the second antenna may be configured along the side surface of the upper end of the electronic device 101. For example, the first antenna 231 and the second antenna 232 may be located on at least a part of a side surface (e.g., the third surface 100C of FIG. 1B) of the electronic device 101. The first antenna 231 and the second antenna 232 may be configured along at least a part of the side surface of the upper end of the electronic device 101.

According to an embodiment, the first electrical path 301 or the second electrical path 302 may be referred to in various names. For example, the first electrical path 301 may be referred to as a first channel. The second electrical path 302 may be referred to as a second channel.

According to an embodiment, the processor 120 may comprise at least a part of the grip sensor 220. For example, the processor 120 may comprise a control circuit for identifying whether the electronic device 101 in the grip sensor 220 is gripped. In the following specification, for convenience of description, an operation of identifying whether the electronic device 101 is gripped by the grip sensor 220 may be described as being performed by the processor 120.

FIG. 3 illustrates an example in which the first antenna 231 and the second antenna 232 are connected to the grip sensor 220 but is not limited thereto. According to an embodiment, the electronic device 101 may comprise a plurality of antennas. The grip sensor 220 may be connected to at least one antenna among a plurality of antennas of the electronic device 101 through at least one electrical path, respectively.

Figure 4:
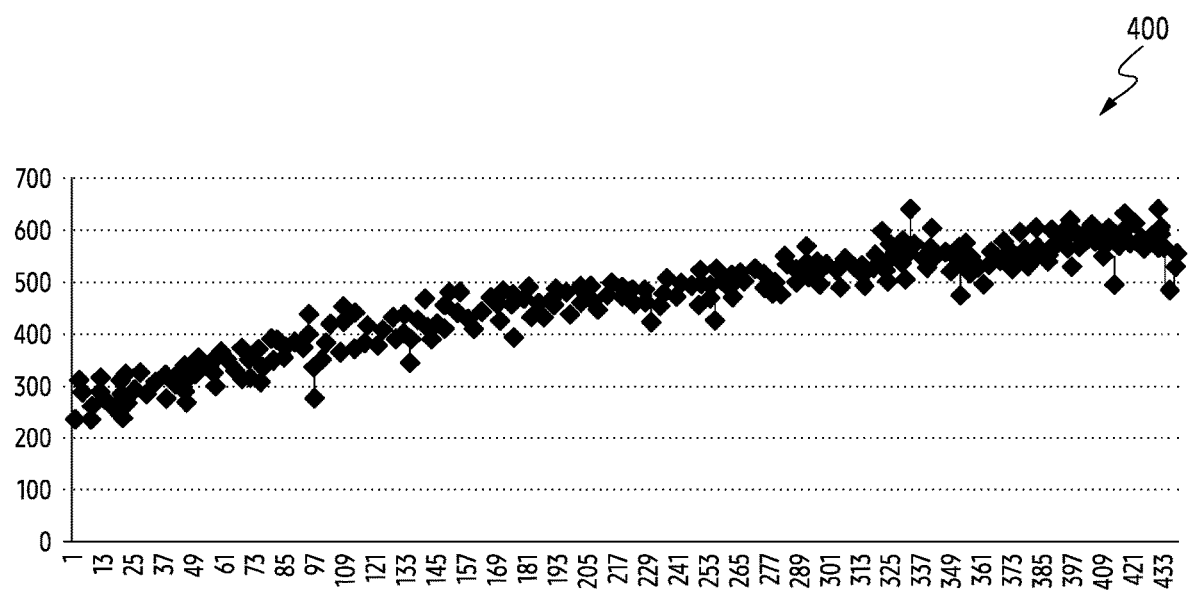
FIG. 4 illustrates an example of a changed amount of capacitance according to a temperature change according to an embodiment of the disclosure.

FIG. 4 illustrates an example of a changed amount of capacitance according to a temperature change according to an embodiment of the disclosure.

Referring to FIG. 4, a capacitor (e.g., a first capacitor 311 or a second capacitor 312) connected to an antenna 230 (e.g., a first antenna 231 or a second antenna 232) of the electronic device 101 may be affected by a temperature change. The graph 400 shown in FIG. 4 illustrates a change amount of capacitance measured in a situation in which a temperature rises over time. The x-axis of the graph 400 shown in FIG. 4 indicates a time. The y-axis of the graph 400 indicates a change amount in capacitance. The graph 400 may indicate that the amount of change in capacitance increases as the temperature increases in an ideal situation.

However, when the antenna (e.g., the first antenna 231) of the electronic device 101 is connected to the grip sensor 220 through an electrical path formed based on the FRC, an error may occur compared to an ideal case. For example, when the antenna of the electronic device 101 is connected to the grip sensor 220 through an electrical path formed based on the FRC, drift according to the temperature condition may be greatly generated. For another example, when the antenna of the electronic device 101 is connected to the grip sensor 220 through an electrical path formed based on the FRC, capacitance of the capacitor connected to the antenna may be rapidly changed. For another example, when the antenna of the electronic device 101 is connected to the grip sensor 220 through an electrical path formed based on the FRC, the amount of change in capacitance at a high temperature may be maintained in a specified range (e.g., a higher range than an ideal case).

According to an embodiment, when the antenna of the electronic device 101 is connected to the grip sensor 220 through an electrical path formed based on the FRC, a varistor may be further connected between the antenna of the electronic device 101 and the grip sensor 220. For example, the varistor may be connected to the antenna to correct an error (e.g., drift) according to a temperature change. For example, the varistor may be tuned to the antenna to correct an error (e.g., drift) according to a temperature change.

Figure 5:
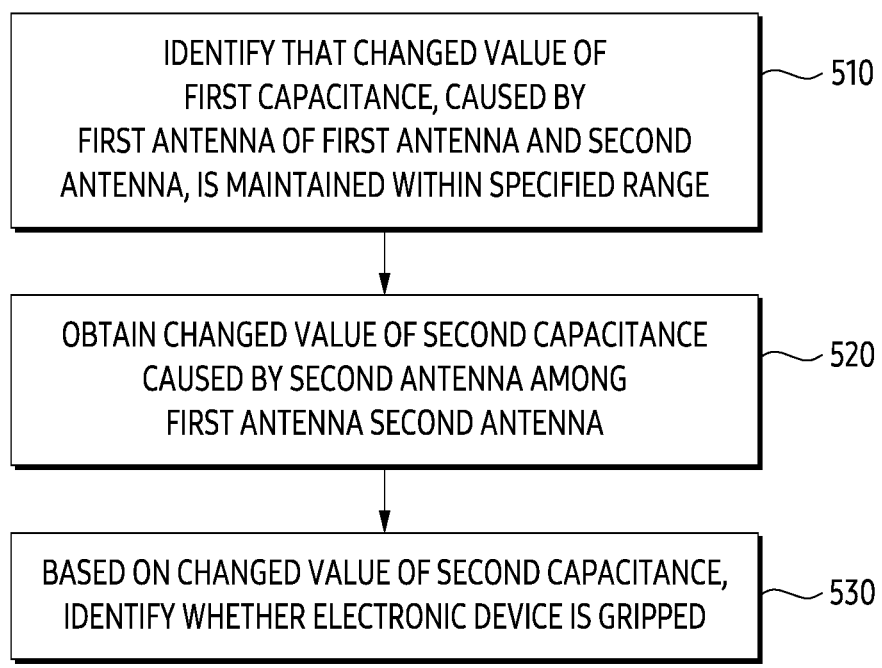
FIG. 5 is a flowchart illustrating an operation of an electronic device according to an embodiment of the disclosure.

FIG. 5 is a flowchart illustrating an operation of an electronic device according to an embodiment of the disclosure. This method may be executed by the electronic device 101 and the processor 120 of the electronic device 101 shown in FIG. 2.

Referring to FIG. 5, in operation 510, the processor 120 (or at least one processor) may identify that a changed value of the first capacitance caused by the first antenna 231 among the first antenna 231 and the second antenna 232 is maintained within a specified range. For example, the processor 120 may identify that the changed value of the first capacitance caused by the first antenna 231 among the first antenna 231 and the second antenna 232 is maintained within a specified range to identify whether the electronic device 101 is gripped.

According to an embodiment, the electronic device 101 may further comprise a first antenna 231, a second antenna 232, a first capacitor 311 connected to the first antenna, a second capacitor 312 connected to the second antenna, and a grip sensor 220 connected to the first antenna 231 through a first electrical path and connected to the second antenna 232 through a second electrical path.

For example, the grip sensor 220 may be connected to the first antenna 231 through a first electrical path formed based on the FRC. For another example, the grip sensor 220 may be connected to the second antenna 232 through a second electrical path formed based on a conductor (or metal) formed on a substrate (e.g., a PCB).

According to an embodiment, the processor 120 may identify whether the electronic device 101 is gripped. The processor 120 may identify whether the electronic device 101 is gripped based on a changed value of capacitance (e.g., first capacitance or second capacitance) caused by at least one among the first antenna 231 and the second antenna 232.

For example, in order to identify whether the electronic device 101 is gripped, the processor 120 may obtain a changed value of a first capacitance caused by the first antenna 231 among the first antenna 231 and the second antenna 232.

For example, a part of the user's body of the electronic device 101 may be in contact with the first antenna 231 of the electronic device 101. In response to the contact of a part of the user's body of the electronic device 101 with the first antenna 231, the first capacitance connected to the first antenna 231 may be changed. The processor 120 may identify whether the electronic device 101 is gripped through the grip sensor 220 based on the first capacitance.

According to an embodiment, the processor 120 may identify a first state in which the electronic device 101 is gripped by the user of the electronic device 101 and a second state in which the electronic device 101 is not gripped by the user of the electronic device 101. The processor 120 may identify a first state in which the electronic device 101 is gripped by the user of the electronic device 101 and a second state in which the user of the electronic device 101 is released.

The value of the first capacitance in the second state in which the electronic device 101 is not gripped by the user of the electronic device 101 may be set as a reference value. In the first state in which the electronic device 101 is gripped by the user of the electronic device 101, the first capacitance may be changed. The processor 120 may obtain a changed value of the first capacitance by comparing the reference value with the changed first capacitance.

The processor 120 may identify that the electronic device 101 is in the first state gripped by the user based on that the changed value of the first capacitance is equal to or greater than the first threshold value. In the first state in which the electronic device 101 is gripped by the user, the processor 120 may obtain a changed value of the first capacitance. The processor 120 may identify, from the first state, a change to the second state in which the user's grip is released based on that the changed value of the first capacitance is less than or equal to the second threshold value smaller than the first threshold value.

For example, the processor 120 may perform a power backoff operation for reducing the magnitude of the transmission power in the first state of the electronic device 101. The processor 120 may cease the power backoff operation based on identifying that the state of the electronic device 101 is changed from the first state to the second state.

According to an embodiment, the processor 120 may identify that the changed value of the first capacitance is maintained within a specified range. For example, the processor 120 may identify that the changed value of the first capacitance is maintained within a specified range for a specified time.

For example, the specified range may be set to be smaller than the first threshold value and larger than the second threshold value. The processor 120 may identify that the changed value of the first capacitance is maintained within a specified range that is smaller than the first threshold value and larger than the second threshold value for a specified time.

According to an embodiment, the processor 120 may identify that the temperature of the electronic device 101 is outside the reference temperature range based on identifying that the changed value of the first capacitance is maintained within a specified range. For example, outside the range of the reference temperature (e.g., room temperature), the changed value of the first capacitance may be identified as not suitable for identifying whether the electronic device 101 is gripped. For another example, outside the reference temperature (e.g., room temperature), a large error may occur in the changed value of the first capacitance.

In operation 520, the processor 120 may obtain a changed value of the second capacitance caused by the second antenna 232 among the first antenna 231 and the second antenna 232. For example, based on identifying that the changed value of the first capacitance is maintained within a specified range, the processor 120 may obtain a changed value of the second capacitance caused by the second antenna 232 among the first antenna 231 and the second antenna 232 through the grip sensor 220.

For example, a part of the user's body of the electronic device 101 may be in contact with the second antenna 232 of the electronic device 101. In response to the contact of a part of the user's body of the electronic device 101 with the second antenna 232, the second capacitance connected to the second antenna 232 may be changed. The processor 120 may obtain a changed value of the second capacitance.

In operation 530, the processor 120 may identify whether the electronic device 101 is gripped based on the changed value of the second capacitance. For example, the processor 120 may change a value for identifying whether the electronic device 101 is gripped from a changed value of the first capacitance to a changed value of the second capacitance.

According to an embodiment, the processor 120 may identify that the electronic device 101 is in the first state gripped by the user based on that the changed value of the second capacitance is equal to or greater than the third threshold value. In the first state in which the electronic device 101 is gripped by the user, the processor 120 may obtain a changed value of the second capacitance. Based on the changed value of the second capacitance is less than or equal to the fourth threshold value smaller than the third threshold value, the processor 120 may identify, from the first state, a change to the second state in which the user's grip is released.

According to an embodiment, while identifying whether the electronic device 101 is gripped based on the changed value of the second capacitance, the processor 120 may identify a changed value of the first capacitance. The processor 120 may identify that the changed value of the first capacitance identified while identifying whether the electronic device 101 is gripped, based on the changed value of the second capacitance, is changed to a reference value. After identifying that the changed value of the first capacitance is changed to the reference value, the processor 120 may identify whether the electronic device 101 is gripped based on the changed value of the first capacitance.

After a value for identifying whether the electronic device 101 is gripped is changed to a changed value of the second capacitance, the processor 120 may identify that the changed value of the first capacitance is changed to a reference value. The processor 120 may identify that the temperature of the electronic device 101 is changed within the reference temperature based on identifying that the changed value of the first capacitance is changed to the reference value. Based on identifying that the temperature of the electronic device 101 has been changed within the reference temperature, the processor 120 may change a value for identifying whether the electronic device 101 is gripped from a changed value of the second capacitance to a changed value of the first capacitance. The processor 120 may identify whether the electronic device 101 is gripped based on the first capacitance.

In operations 510 to 530, when the changed value of the first capacitance is maintained within a specified range, although an operation in which the processor 120 identifies whether the electronic device 101 is gripped based on a changed value of the second capacitance has been described, it is not limited thereto. For example, when the changed value of the first capacitance is changed to a specified value or more for a specified time, the processor 120 may identify whether the electronic device 101 is gripped based on the changed value of the second capacitance. For example, when the changed value of the first capacitance is rapidly changed, the processor 120 may identify whether the electronic device 101 is gripped based on the changed value of the second capacitance.

Figure 6:
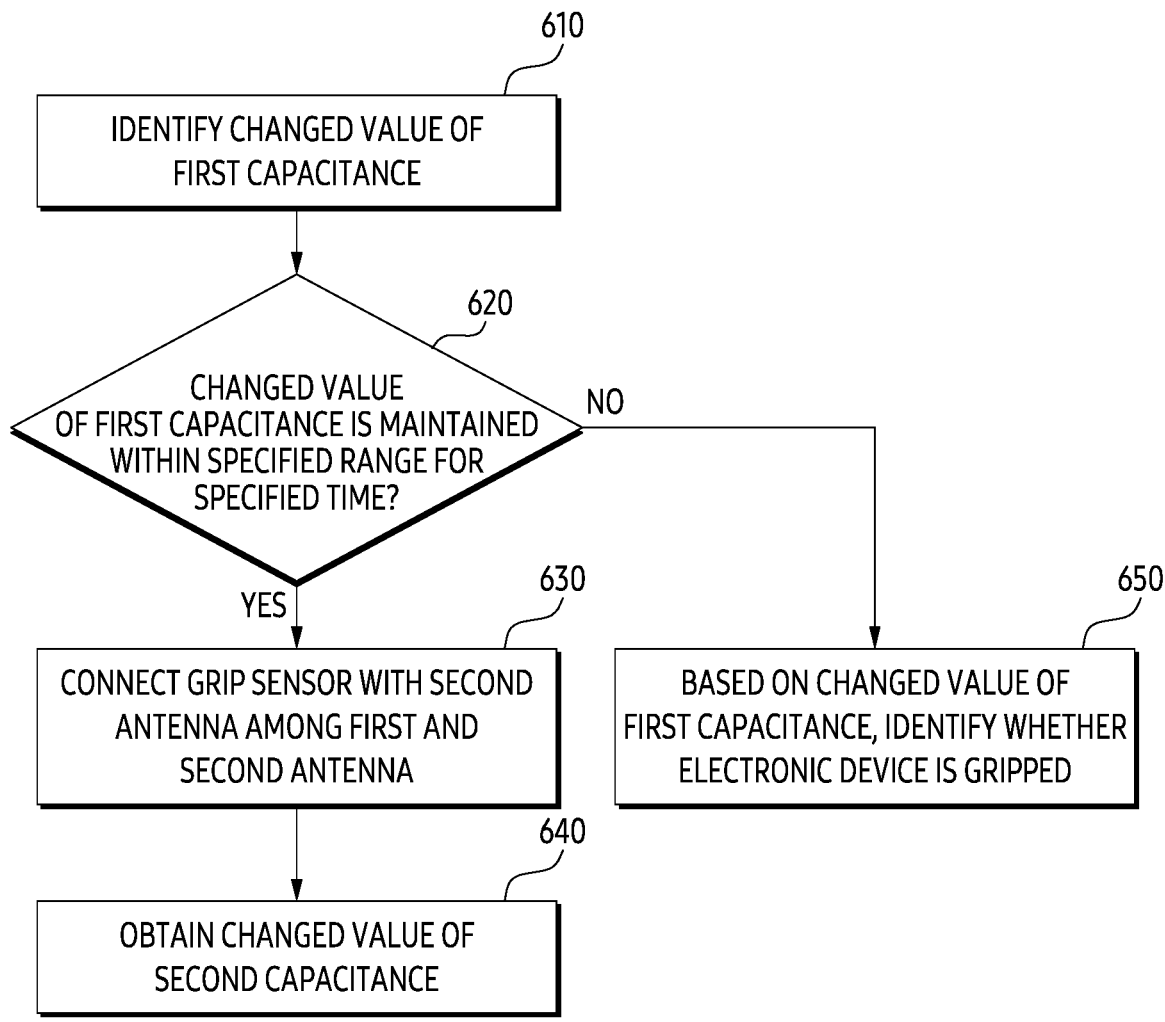
FIG. 6 is a flowchart illustrating another operation of an electronic device according to an embodiment of the disclosure.

FIG. 6 is a flowchart illustrating another operation of an electronic device according to an embodiment of the disclosure.

Referring to FIG. 6, operations 610 to 650 of FIG. 6 may be related to operations 510 and 520 of FIG. 5.

In operation 610, the processor 120 (or at least one processor) may identify a changed value of the first capacitance. The electronic device 101 may further comprise a first switch 321 and a second switch 322. The first switch 321 may be used to control the first electrical path. The first switch 321 may be used to control connection between the first antenna 231 and the grip sensor 220. The second switch 322 may be used to control the second electrical path. The second switch 322 may be used to control connection between the second antenna 232 and the grip sensor 220.

For example, the processor 120 may connect the first electrical path through the first switch 321. The processor 120 may connect the first antenna 231 to the grip sensor 220 using the first switch 321. The processor 120 may block the second electrical path using the second switch 322. The processor 120 may block the connection between the second antenna 232 and the grip sensor 220 using the second switch 322. The processor 120 may identify a changed value of the first capacitance caused by the first antenna 231 in a state in which the first electrical path is connected and the second electrical path is blocked.

In operation 620, the processor 120 may identify whether the changed value of the first capacitance is maintained within a specified range for a specified time. For example, when the first antenna 231 of the first antenna 231 and the second antenna 232 is connected to the grip sensor, the processor 120 may identify whether the changed value of the first capacitance is maintained within a specified range for a specified time. For example, in a state where the first electrical path is connected and the second electrical path is blocked, the processor 120 may identify whether the changed value of the first capacitance is maintained within a specified range for a specified time.

In operation 630, when the changed value of the first capacitance is maintained within a specified range for a specified time, the processor 120 may connect the second antenna 232 among the first antenna 231 and the second antenna 232 with the grip sensor 220. The processor 120 may connect the second antenna 232 among the first antenna 231 and the second antenna 232 with the grip sensor 220 based on identifying that the changed value of the first capacitance is maintained within a specified range for a specified time. For example, based on identifying that the changed value of the first capacitance is maintained within a specified range for a specified time, the processor 120 may block the connection between the first antenna 231 and the grip sensor 220 using the first switch 321 and connect the second antenna 232 to the grip sensor 220 using the second switch 322.

For example, the processor 120 may identify that the changed value of the first capacitance is maintained within a specified range in a state where the first electrical path is connected, and the second electrical path is blocked. The processor 120 may control the first switch 321 and the second switch 322 based on identifying that the changed value of the first capacitance is maintained within a specified range. The processor 120 may block the first electrical path through the first switch 321. The processor 120 may connect the second electrical path through the second switch 322. For example, the processor 120 may block the first electrical path and connect the second electrical path based on identifying that the changed value of the first capacitance is maintained within a specified range. After the first electrical path is blocked and the second electrical path is connected, the processor 120 may obtain a changed value of the second capacitance through the grip sensor 220.

In operation 640, after connecting the second antenna 232 and the grip sensor 220, the processor 120 may obtain a changed value of the second capacitance caused by the second antenna 232. For example, after connecting the second antenna 232 and the grip sensor 220 using the second switch, the processor 120 may obtain a changed value of the second capacitance caused by the second antenna 232. The processor 120 may identify whether the electronic device 101 is gripped based on the changed value of the second capacitance.

In operation 650, when the changed value of the first capacitance is not maintained within a specified range for a specified time, the processor 120 may identify whether the electronic device 101 is gripped based on the changed value of the first capacitance. For example, the processor 120 may maintain a connection between the first antenna 231 and the grip sensor 220. The processor 120 may identify whether the electronic device 101 is gripped based on a changed value of the first capacitance caused by the first antenna 231.

Figure 7:
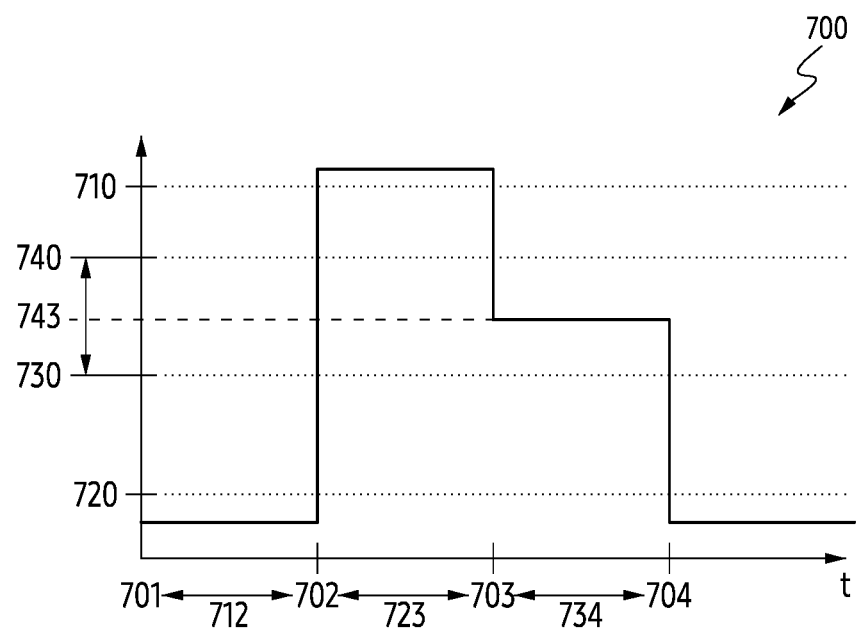
FIG. 7 illustrates an example of an operation of an electronic device according to an embodiment of the disclosure.

FIG. 7 illustrates an example of an operation of an electronic device according to an embodiment of the disclosure.

Referring to FIG. 7, a graph 700 indicates a changed value of a first capacitance over time. The x-axis of the graph 700 indicates time. The y-axis of the graph 700 indicates a changed value of the first capacitance. In the interval 712 between the time point 701 and the time point 702, the processor 120 may identify that the changed value of the first capacitance is equal to or less than the second threshold value 720. The processor 120 may identify a second state in which the electronic device 101 is not gripped in the section 712.

In the interval 723 between the time point 702 and the time point 703, the processor 120 may identify that the changed value of the first capacitance is greater than or equal to the first threshold value 710. The processor 120 may identify a first state in which the electronic device 101 is gripped in the section 723.

In the interval 734 between the time point 703 and the time point 704, the processor 120 may identify that the changed value of the first capacitance is maintained within a specified range 743. The specified range 743 may be set between the first value 730 and the second value 740. The processor 120 may identify that the changed value of the first capacitance is maintained between the first value 730 and the second value 740. The processor 120 may identify that the temperature of the electronic device 101 is outside the reference temperature range based on identifying that the changed value of the first capacitance is maintained within a specified range 743. For example, the processor 120 may identify that the temperature of the electronic device 101 is a high temperature or a low temperature that is unsuitable for identifying whether the electronic device 101 is gripped based on the changed value of the first capacitance. FIG. 7 illustrates an example in which a changed value of the first capacitance is constantly maintained within a specified range 743 for convenience of description but is not limited thereto. The changed value of the first capacitance may be changed within the specified range 743.

The processor 120 may obtain a changed value of the second capacitance based on identifying that the changed value of the first capacitance is maintained within the specified range 743. The processor 120 may identify whether the electronic device 101 is gripped based on the changed value of the second capacitance. For example, the processor 120 may block the first electrical path between the first antenna 231 and the grip sensor 220 and may connect (or activate) the second electrical path between the second antenna 232 and the grip sensor 220. For example, in order to determine whether the electronic device 101 is gripped, the processor 120 may cease an operation of identifying a changed value of the first capacitance and may identify a changed value of the second capacitance.

The processor 120 may identify a changed value of the first capacitance while identifying whether the electronic device 101 is gripped based on the changed value of the second capacitance. After the time point 704, the processor 120 may identify that the changed value of the first capacitance is changed to a reference value. For example, the reference value may be set to a second threshold value 720 or less. For another example, the reference value may be set as a changed value of the second capacitance maintained in the second state in which the electronic device 101 is not gripped within the reference temperature range.

After identifying that the changed value of the second capacitance is changed to the reference value, the processor 120 may identify whether the electronic device 101 is gripped based on the changed value of the first capacitance. For example, the processor 120 may connect (or activate) a first electrical path between the first antenna 231 and the grip sensor 220 and may block a second electrical path between the second antenna 232 and the grip sensor 220. For example, in order to determine whether the electronic device 101 is gripped, the processor 120 may cease an operation of identifying a changed value of the second capacitance and may identify a changed value of the first capacitance.

Unlike the above-described embodiments, according to an embodiment, the electronic device 101 may be configured to a foldable structure. The electronic device 101 may comprise at least one antenna in each of an upper end of the electronic device 101 and a lower end of the electronic device 101. For example, at least one antenna may be configured on the upper end of the electronic device 101. At least one antenna may be configured at the lower end of the electronic device 101. Hereinafter, in FIGS. 8 and 9, an example of an electronic device 101 configured in a foldable structure may be described.

Figure 8:
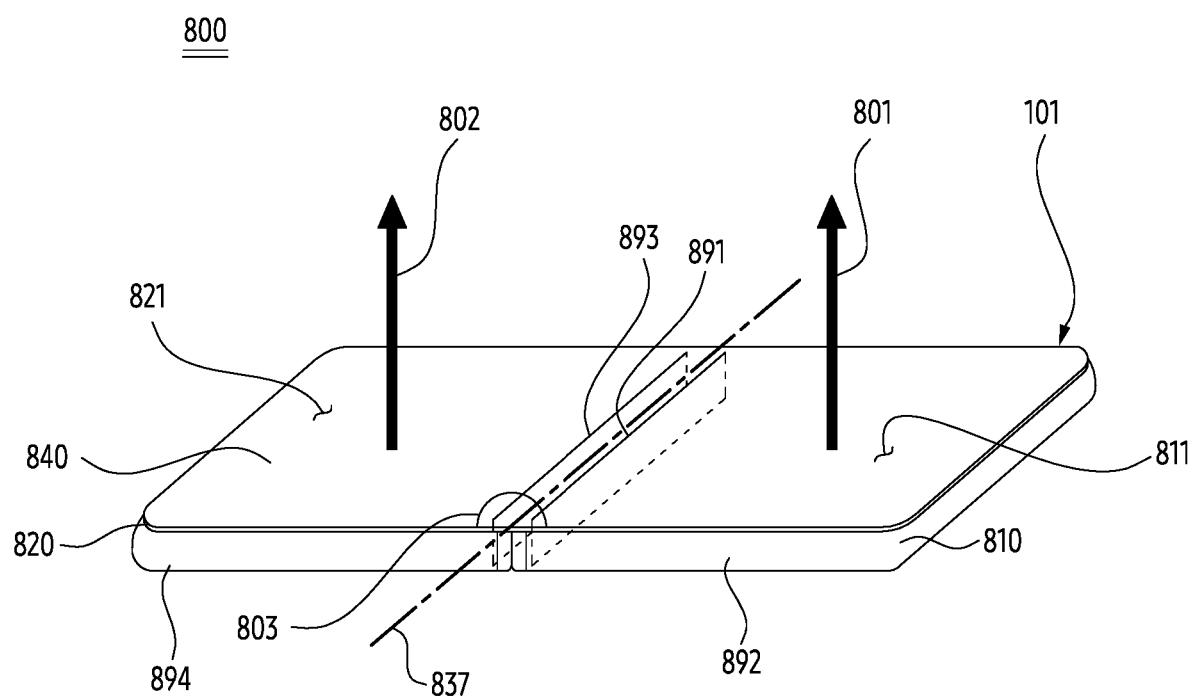
FIG. 8 illustrates an example of an unfolded state of an electronic device according to an embodiment of the disclosure.

FIG. 8 illustrates an example of an unfolded state of an electronic device according to an embodiment of the disclosure.

Figure 9:
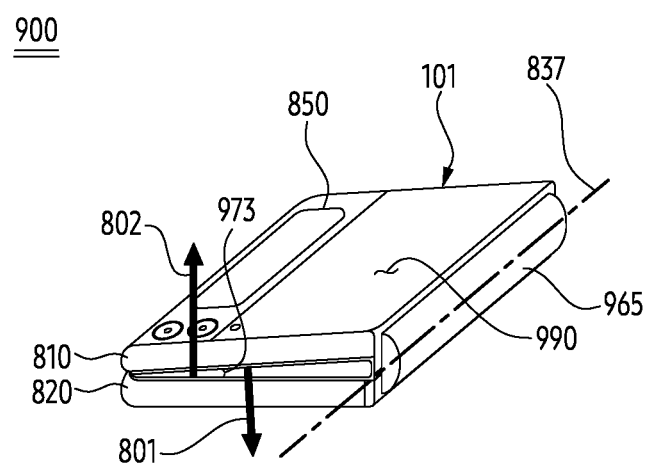
FIG. 9 illustrates an example of a folded state of an electronic device according to an embodiment of the disclosure.

FIG. 9 illustrates an example of a folded state of an electronic device according to an embodiment of the disclosure.

According to an embodiment, the electronic device 101, which is a foldable electronic device, may provide various states through the first display 840. For example, the electronic device 101 may provide an unfolded state and a folded state.

Referring to FIG. 8, the electronic device 101 may be in a state 800 in which the first housing 810 and the second housing 820 are completely unfolded through a hinge structure included in the folded housing (folded housing 965 shown in FIG. 9).

According to an embodiment, the first housing 810 may comprise a first surface 811, a third surface (e.g., the third surface 990 illustrated in FIG. 9) faced away from the first surface 811 and the first side surface 891 and the second side surface 892 between the first surface 811 and the second surface 821.

According to one embodiment, the second housing 820 may comprise a second surface 821, a fourth surface (not shown) faced away from the second surface 821 and the third side surface 893 and the fourth side 894 between the second surface 821 and the fourth side 894.

According to one embodiment, the folding housing may comprise a hinge structure rotatably connecting the first side surface 891 of the first housing 810 and the third side surface 893 of the second housing 820 facing the first side surface 891 with respect to a folding axis 837.

According to one embodiment, the state 800 may mean a state in which the first direction 801 facing the first surface 811 of the first housing 810 corresponds to a second direction 802 facing the second surface 821 of the second housing 820. For example, the first direction 801 may be parallel to the second direction 802 in the state 800. For example, the first direction 801 may be the same as the second direction 802 in the state 800.

According to an embodiment, in the state 800, the first surface 811 may form a substantially single flat surface with the second surface 821. For example, in the state 800, an angle 803 between the first surface 811 and the second surface 821 may be 180 degrees. For example, the state 800 may mean a state in which the entire display area of the first display 840 may be provided on substantially single flat surface. For example, in the state 800, the display area of the first display 840 may not comprise a curved surface. The unfolding state may be referred to as an outspread state or an outspreading state.

Referring to FIG. 9, the electronic device 101 may provide the folded state 900 in which the first housing 810 and the second housing 820 are folded in through a hinge structure in the folded housing 965.

According to one embodiment, the folded state including the state 900 may refer to a state in which the first direction 801 facing the first surface 811 (not shown in FIG. 9) is distinguished from the second direction 802 facing the second surface 821 (not shown in FIG. 9). For example, in the state 900, the angle between the first direction 801 and the second direction 802 is substantially 180 degrees, and the first direction 801 and the second direction 802 may be distinguished from each other. For example, in state 900, the angle 973 between the first surface 811 and the second surface 821 may be substantially 0 degrees. The folded state may be referred to as a folding state. For example, the electronic device 101 may provide a state 900 in which the display area of the first display 840 corresponding to the second surface 821 substantially completely overlaps the display area of the first display 840 corresponding to the first surface 811 by facing the first surface 811 and the second surface 821 through a hinge structure in the folding housing 965. For example, the electronic device 101 may provide a state 900 in which the first direction 801 is substantially opposite to the second direction 802. For another example, the state 900 may mean a state in which a display area of the first display 240 is covered within a user's field of view looking at the electronic device 101. However, it is not limited thereto.

In an embodiment, the first display 840 may be bent by rotation provided through a hinge structure in the folding housing 965. For example, within state 900, a part of the display area of the first display 840 may be bent. For example, the part of the display area of the first display 840 may be in a curved state to prevent damage to the first display 840 in the folded state. However, it is not limited thereto.

For example, the processor 120 may identify an angle between the first direction 801 facing the first surface 811 of the first housing 810 and the second direction 802 facing the second surface 821 of the second housing 820 through at least one of a hall sensor in the electronic device 101, a first sensor 270 in the electronic device 101, a rotation sensor in the folding housing 965 and a stretch sensor in the electronic device 101.

Meanwhile, in an embodiment, the first housing 810 may comprise a second display 850 on the third surface 990 facing the first surface 811. For example, the second display 850 may be used to provide visual information within a folding state in which the display area of the first display 840 is not visible.

According to an embodiment, the electronic device 101 may comprise at least one antenna formed in at least a part of the second side surface 892 of the first housing 810. The electronic device 101 may comprise at least one antenna formed in at least a part of the fourth side 894 of the second housing 820. For example, at least one antenna formed in at least a part of the second side surface 892 of the first housing 810 may comprise a first antenna. At least one antenna formed in at least a part of the fourth side 894 of the second housing 820 may comprise a second antenna. Hereinafter, in FIG. 10, an example of a structure of at least one antenna formed in at least a part of the second side surface 892 and at least one antenna formed in at least a part of the fourth side 894 may be described.

Figure 10:
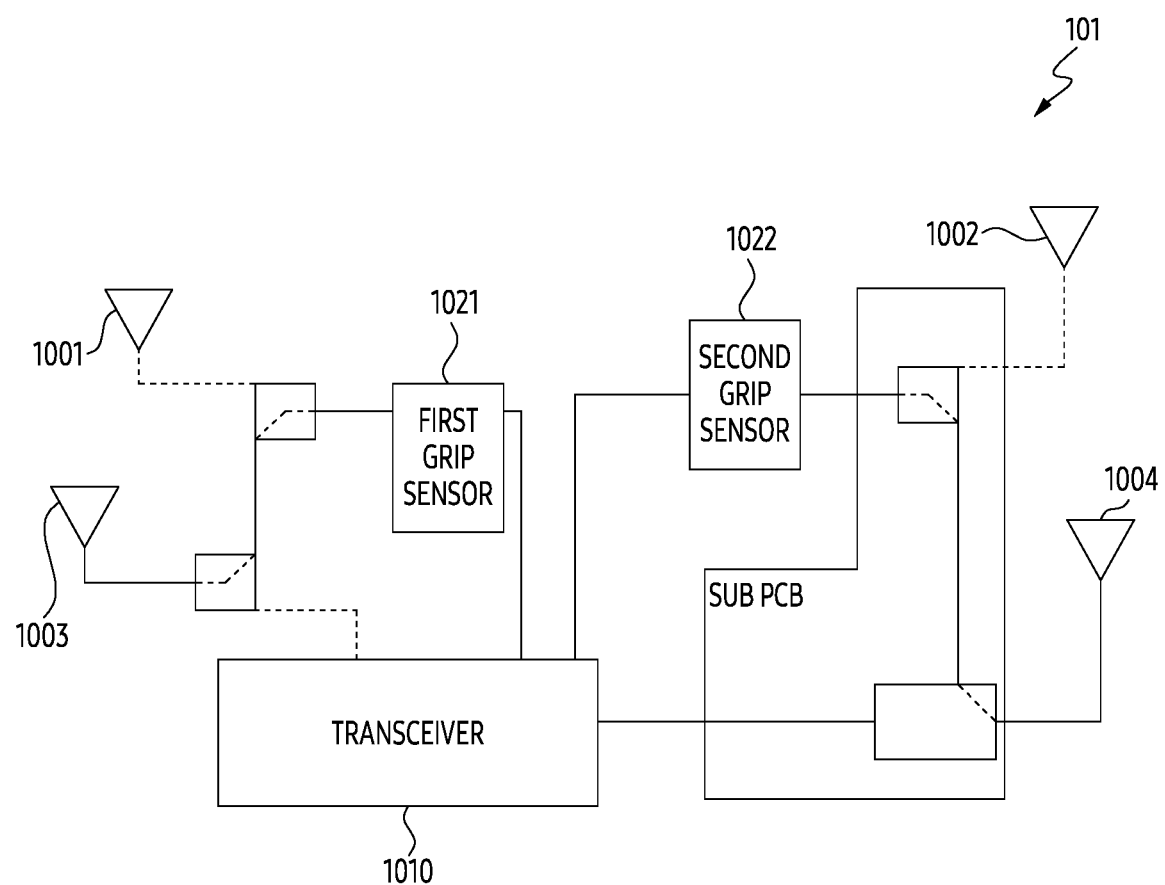
FIG. 10 illustrates an example of a connection structure of a plurality of antennas of an electronic device according to an embodiment of the disclosure.

FIG. 10 illustrates an example of a connection structure of a plurality of antennas of an electronic device according to an embodiment of the disclosure.

Referring to FIG. 10, the electronic device 101 may comprise a first housing (e.g., the first housing 810 of FIG. 8), a second housing (e.g., the second housing 820 of FIG. 8), and a third housing (e.g., the folding housing 965 of FIG. 9).

For example, the first housing may comprise a first surface (e.g., the first surface 811 of FIG. 8), a second surface faced away from the first surface, a first side surface (e.g., the first side surface 891 of FIG. 8) between the first surface and the second side surface, a second side surface between the first surface and the second side surface (e.g., the second side surface 892 of FIG. 8).

For example, the second housing may comprise a third surface (e.g., the second surface 821 of FIG. 8), a fourth surface separated when facing the third surface, a third side surface (e.g., the third side surface 893 of FIG. 8) between the third surface and the fourth side surface, a fourth side surface between the third surface and the fourth side surface (e.g., the fourth side 894 of FIG. 8).

For example, the third housing may comprise a hinge structure rotatably connecting a first side surface of the first housing and a third side surface of the second housing facing the first side surface of the first housing with respect to a folding axis.

According to an embodiment, the electronic device 101 may comprise at least one antenna formed in at least a part of the second side surface. At least one antenna formed in at least a part of the second side surface may be referred to as upper antennas. For example, at least one antenna formed in at least a part of the second side surface may comprise a first antenna 1001 and a third antenna 1003.

According to an embodiment, the electronic device 101 may comprise at least one antenna formed in at least a part of the fourth side surface. At least one antenna formed in at least a part of the fourth side surface may be referred to as lower antennas. For example, at least one antenna formed in at least a part of the fourth side surface may comprise a second antenna 1002 and a fourth antenna 1004.

According to an embodiment, the electronic device 101 may further comprise a transceiver 1010, a first grip sensor 1021, and a second grip sensor 1022. Although not shown, the transceiver 1010, the first grip sensor 1021, and the second grip sensor 1022 may be controlled by the processor 120.

For example, the transceiver 1010 may be used to transmit or receive a signal through the first antenna 1001 to fourth antenna 1004.

For example, the first grip sensor 1021 may be connected to the first antenna 1001 and the third antenna 1003. The first grip sensor 1021 may identify whether the electronic device 101 is gripped by a user based on at least one of a changed value in capacitance of the capacitor connected to the first antenna 1001 and a changed value in capacitance of the capacitor connected to the third antenna 1003.

For example, the second grip sensor 1022 may be connected to the second antenna 1002 and the fourth antenna 1004. The second grip sensor 1022 may identify whether the electronic device 101 is gripped by a user based on at least one of a change in capacitance of a capacitor connected to the second antenna 1002 and a change in capacitance of the capacitor connected to the fourth antenna 1004.

According to an embodiment, in a state in which the electronic device 101 is unfolded (e.g., the state 800 of FIG. 8), the processor 120 may identify whether the electronic device 101 is gripped through the first grip sensor 1021, based on at least one of a changed value in capacitance of the capacitor connected to the first antenna 1001 and a changed value in capacitance of the capacitor connected to the third antenna 1003. For example, the processor 120 may identify whether the electronic device 101 is gripped through the first grip sensor 1021, based on a changed value in capacitance of the capacitor connected to the first antenna 1001.

While identifying whether the electronic device 101 is gripped based on a change in capacitance of the capacitor connected to the first antenna 1001, the electronic device 101 may be changed from an unfolded state to a folded state (e.g., the state 900 of FIG. 9). The processor 120 may change an antenna for identifying whether the electronic device 101 is gripped based on identifying that the electronic device 101 is changed from the unfolded state to the folded state. For example, the processor 120 may change the antenna for identifying whether to grip from the first antenna 1001 to the second antenna 1002. For example, the processor 120 may deactivate the first grip sensor 1021. The processor 120 may activate the second grip sensor 1022. The processor 120 may identify whether the electronic device 101 is gripped based on the changed value of the capacitance of the capacitor connected to the second antenna 1002 among the second antenna 1002 and the fourth antenna 1004.

Figure 11:
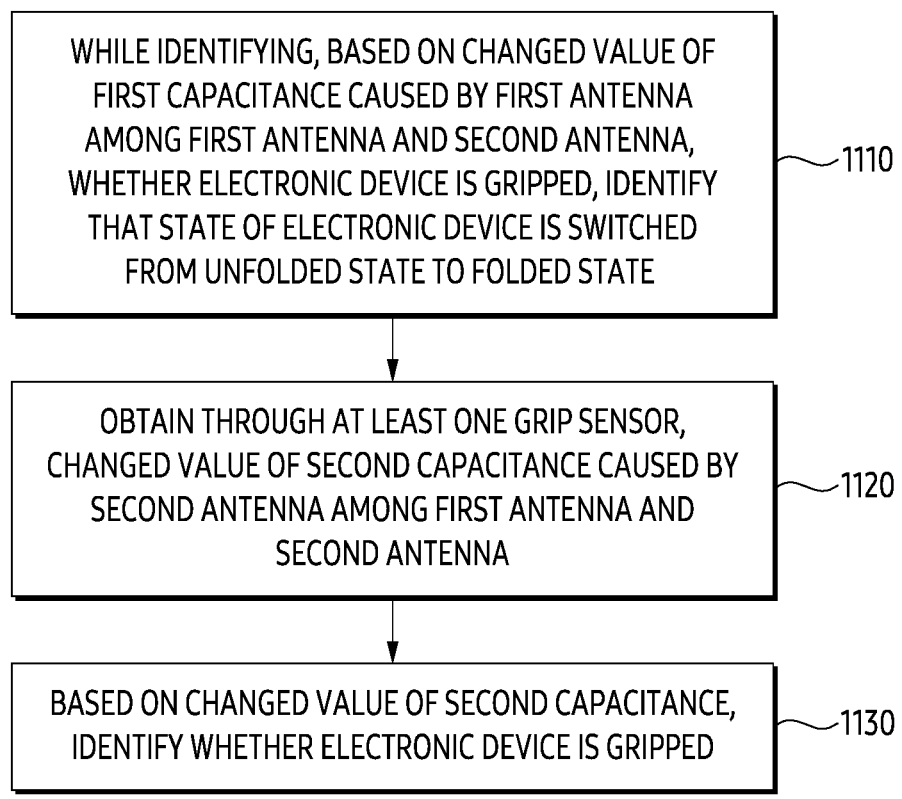
FIG. 11 is a flowchart illustrating another operation of an electronic device according to an embodiment of the disclosure.

FIG. 11 is a flowchart illustrating another operation of an electronic device according to an embodiment of the disclosure. This method may be executed by the electronic device 101 shown in FIG. 2, the electronic device 101 shown in FIG. 10, and the processor 120 of the electronic device 101.

Referring to FIG. 11, in operation 1110, while identifying whether the electronic device 101 is gripped based on a changed value of the first capacitance caused by the first antenna among the first antenna and the second antenna, the processor 120 (or at least one processor) may identify that the state of the electronic device 101 is switched from the unfolded state to the folded state.

For example, when the state of the electronic device 101 is in the unfolded state, the processor 120 may identify whether the electronic device 101 is gripped based on a changed value of the first capacitance caused by the first antenna located at the upper end of the electronic device 101. For example, the first antenna may be one of at least one antenna positioned at an upper end of the electronic device 101. The processor 120 may obtain a changed value of the first capacitance through at least one grip sensor. The processor 120 may identify whether the electronic device 101 is gripped based on the obtained changed value of the first capacitance.

For example, at least one grip sensor may comprise a first grip sensor (e.g., the first grip sensor 1021 of FIG. 10) connected to the first antenna through a first electrical path, and a second grip sensor (e.g., the second grip sensor 1022 of FIG. 10) connected to the second antenna through a second electrical path. The first grip sensor may be set to identify whether the electronic device 101 is gripped based on a changed value of the first capacitance. The second grip sensor may be set to identify whether the electronic device 101 is gripped based on a changed value of the second capacitance.

For example, when the electronic device 101 is in an unfolded state, the processor 120 may identify whether the electronic device 101 is gripped through the first grip sensor, based on the changed value of the first capacitance. The processor 120 may activate a first electrical path between the first grip sensor and the first antenna. The processor 120 may deactivate (or block) the second electrical path between the second grip sensor and the second antenna.

In operation 1120, the processor 120 may obtain a changed value of the second capacitance caused by the second antenna among the first antenna and the second antenna through at least one grip sensor (e.g., a second grip sensor).

For example, the second antenna may be one of at least one antenna located at the lower end of the electronic device 101. The processor 120 may obtain a changed value of the second capacitance through at least one grip sensor (e.g., a second grip sensor).

In operation 1130, the processor 120 may identify whether the electronic device 101 is gripped based on the changed value of the second capacitance. For example, when the state of the electronic device 101 is in the folded state, the processor 120 may identify whether the electronic device 101 is gripped based on a changed value of the second capacitance caused by the second antenna located at the lower end of the electronic device 101.

For example, when the state of the electronic device 101 is in the folded state, the processor 120 may identify whether the electronic device 101 is gripped based on a changed value of the second capacitance through the second grip sensor. The processor 120 may deactivate (or block) the first electrical path between the first grip sensor and the first antenna. The processor 120 may activate a second electrical path between the second grip sensor and the second antenna.

In operations 1110 to 1130, although an example in which a first antenna at the upper end of the electronic device 101 is used in the folding state and a second antenna at the lower end of the electronic device 101 is used in the unfolding state is illustrated, it is not limited thereto. Based on identifying that the state of electronic device 101 is changed from the folded state to the unfolded state, the processor 120 may identify an antenna suitable for identifying whether the electronic device 101 is gripped among a plurality of antennas of the electronic device 101. The processor 120 may identify whether the electronic device 101 is gripped based on a changed value in capacitance of the capacitor connected to the identified antenna.

Figure 12:
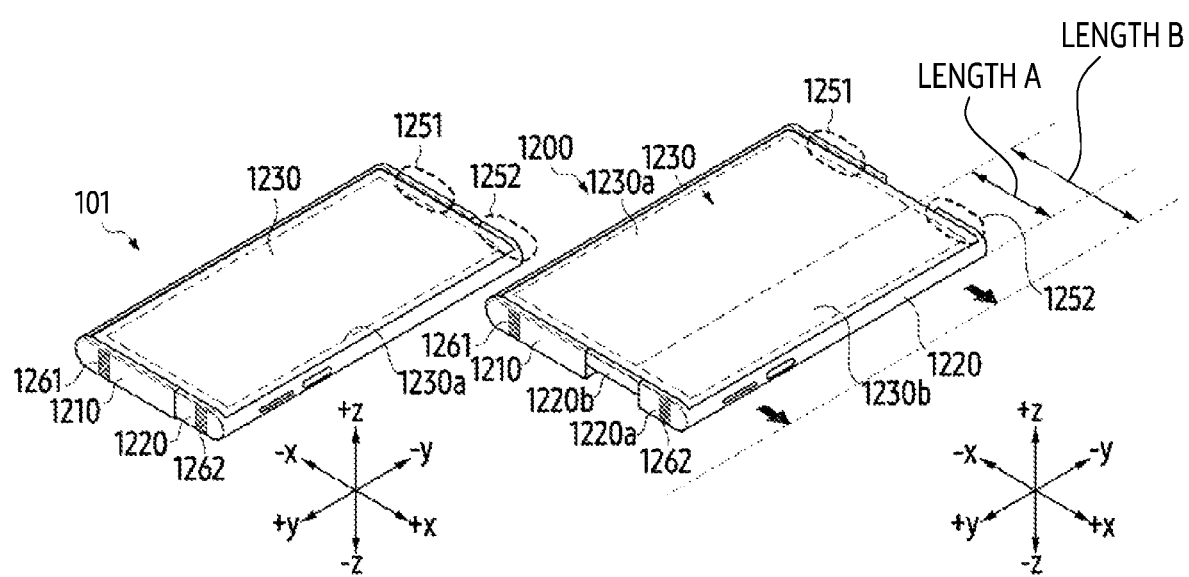
FIG. 12 is a diagram illustrating a structure and shape change of an electronic device including a flexible display according to an embodiment of the disclosure.

FIG. 12 is a diagram illustrating a structure and shape change of an electronic device including a flexible display according to an embodiment of the disclosure.

Referring to FIG. 12, an electronic device 101 (e.g., the electronic device 101 of FIG. 1A) in accordance with various embodiments may comprise a first housing 1210 and a second housing 1220. According to an embodiment, the second housing 1220 may move in a specified direction from the first housing 1210, for example, a first direction (+X direction). For example, the second housing 1220 may slide by a specified distance in the first direction (+X direction) from the first housing 1210. According to an embodiment, the second housing 1220 may reciprocate within a specified distance in the first direction (+X direction) from a part of the first housing 1210.

In various embodiments of the disclosure, a state in which the second housing 1220 slides from the first housing 1210 in the first direction (+X direction) may be defined as a second state (e.g., extended state or slide-out state) of the electronic device 101. In various embodiments of the disclosure, the second state of the electronic device 101 may be defined as a state in which the second part 1230*b* of the display 1230 is visually exposed from the outside. Alternatively, the second state of the electronic device 101 may mean a state in which the second part 1230*b* of the display 1230 is located outside the second housing 1220. According to one embodiment, the second housing 1220 may move from the first housing 1210 in the first direction (+X direction) to at least a part of the second housing 1220 and/or the second part 1230*b* of the display 1230 may be drawn out and may form a withdrawal length (e.g., a length A) corresponding to the moving distance. According to an embodiment, the second housing 1220 may reciprocate within a specified distance (e.g., length B). According to an embodiment, the withdrawal length (e.g., length A) may have a size of about 0 to length B.

In various embodiments of the disclosure, a state in which the second housing 1220 slides in a direction of the first housing 1210, for example, a second direction (−X direction) opposite to a first direction (+X direction), may be defined as a first state (e.g., retracted state or slide-in state) of the electronic device 101. In various embodiments of the disclosure, the first state of the electronic device 101 may be defined as a state in which the second part 1230*b* of the display 1230 is not visually exposed from the outside. Alternatively, the first state of the electronic device 101 may mean a state in which the second part 1230*b* of the display 1230 is located inside the second housing 1220.

In various embodiments, the first state may be referred to as a first shape, and the second state may be referred to as a second shape. For example, the first shape may comprise a normal state, a retracted state, or a closed state, and the second shape may comprise an open state. In addition, in an embodiment, the electronic device 101 may form a third state (e.g., an intermediate state) that is a state between the first state and the second state. For example, the third state may be referred to as a third shape, and the third shape may comprise a free stop state.

In accordance with the various embodiments of the disclosure, in switching to the second state and/or the first state, the electronic device 101 may be manually switched by a user's operation or may be automatically switched through a driving module (not shown) disposed inside the first housing 1210 or the second housing 1220. According to an embodiment, the driving module may be triggered an operation based on a user input. According to an embodiment, the user input for triggering the operation of the driving module may comprise a touch input through display 1230, a force touch input, and/or a gesture input. In another embodiment, the user input for triggering the operation of the driving module may comprise a sound input (voice input) or an input of a physical button exposed to the outside of the first housing 1210 or the second housing 1220. According to an embodiment, the driving module may be driven in a semi-automatic manner in which an operation is triggered when a manual operation by an external force of a user is detected.

According to an embodiment, the electronic device 101 may be referred to as a "slidable electronic device" as the second housing 1220 is designed to slide, or as a "rollable electronic device" as at least a part of the display 1230 is designed to be wound inside the second housing 1220 (or the first housing 1210) based on the slide movement of the second housing 1220.

According to an embodiment, the electronic device 101 may be coupled such that the second housing 1220 is at least partially slidably movable from the first housing 1210. According to an embodiment, the coupling shape of the first housing 1210 and the second housing 1220 is not limited to the shape and coupling shown in FIG. 12 and may be implemented by a combination and/or coupling of other shapes or components.

According to an embodiment, the second housing 1220 of the electronic device 101 may comprise side surface members 1220*a* and 1220*b* surrounding some side surfaces of the electronic device 101. According to an embodiment, the side surface members 1220*a* and 1220*b* of the second housing 1220 may comprise a first side surface member 1220*a* that is always visually exposed from the outside in the second state and the first state of the electronic device 101 without being inserted into the second housing 1220 and a second side surface member 1220*b* inserted into or withdrawn from the inner space of the second housing 1220 through one end of the second housing 1220.

According to an embodiment, the second side surface member 1220*b* of the second housing 1220 may not be visually exposed from the outside in the first state but may be visually exposed from the outside in the second state.

According to an embodiment, the display 1230 may be disposed to be visually exposed from the outside through the front direction (e.g., the +Z direction) of each of the first housing 1210 and the second housing 1220. According to an embodiment, the display area of the display 1230 may comprise a first part 1230*a* and a second part 1230*b*.

According to an embodiment, the first part 1230*a* of the display 1230 may be a display area that is fixedly visually exposed from the outside regardless of whether the electronic device 101 is in a second state or a first state. For example, the first part 1230*a* of the display 1230 may be fixed without movement regardless of slide movement of the second housing 1220.

According to an embodiment, the second part 1230*b* of the display 1230 may be a display area extending from one end of the first part 1230*a* and may be inserted into the inner space of the second housing 1220 or may be withdrawn to the outside from the inner space of the second housing 1220 by interlocking with the slide movement of the second housing 1220. According to an embodiment, a hole (not shown) into which the second part 1230*b* of the display 1230 is drawn out or inserted may be disposed adjacent to a side surface in the +X direction of the second housing 1220. For example, the second part 1230*b* of the display 1230 may be drawn out or inserted from the boundary part in the +X direction of the second housing 1220.

According to an embodiment, the second part 1230*b* of the display 1230 may be drawn out from the inner space of the second housing 1220 in the second state and visually exposed from the outside. According to an embodiment, the second part 1230*b* of the display 1230 may be inserted into the inner space of the second housing 1220 in the first state and may not be visually exposed from the outside.

According to an embodiment, the second part 1230*b* of the display 1230 may comprise a flexible display. The second part 1230*b* may be inserted in a bent state while being rolled into the inner space of the second housing 1220 in the first state.

According to an embodiment, the display area of the display 1230 in the first state may be visually exposed from the outside only the first part 1230*a* of the display 1230.

According to an embodiment, the display area of the display 1230 in the second state may visually expose the first part 1230*a* and the second part 1230*b* of the display 1230 from the outside.

According to various embodiments, although not shown, the electronic device 101 may comprise a sensor module and/or a camera module.

According to an embodiment, the sensor module may be disposed under the display 1230 (e.g., in the −Z direction from the display 1230) and may detect an external environment based on information (e.g., light) received through the display 1230. According to an embodiment, the sensor module may comprise at least one of a receiver, a proximity sensor, an ultrasonic sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, a motor encoder, and an indicator. According to an embodiment, at least some sensor modules of the electronic device 101 may be visually exposed from the outside through a partial area of the display 1230. According to an embodiment, the electronic device 101 may detect a withdrawal length (e.g., a length A) using the sensor module. According to an embodiment, the electronic device 101 may generate withdrawal information on the withdrawal degree detected by the sensor. For example, the electronic device 101 may detect and/or check the withdrawal degree of the second housing 1220 using the withdrawal information. According to an embodiment, the withdrawal information may comprise information on the withdrawal length of the second housing 1220.

According to an embodiment, the electronic device 101 may comprise housing (e.g., the first housing 1210 and the second housing 1220) and a display including a first part 1230*a* and a second part 1230*b*; a first part 1230*a* that is fixedly exposed to the outside regardless of movement of at least a part of the housings 1210 and 1220 in the first direction, as the display 1230 supported by the housings 1210 and 1220 and in which the area of the display area is adjusted in conjunction with at least a part of the housings 1210 and 1220 moving in the first direction; a second part 1230*b* extending from one end of the first part 1230*a* and exposed to the outside by being drawn out from the inner space of the housings 1210 and 1220 interworking with at least a part of the housings 1210 and 1220 moving in the first direction.

According to various embodiments, the electronic device 101 may comprise at least one antenna. The at least one antenna may receive a communication signal outside the electronic device 101. According to an embodiment, at least one antenna may be disposed in some areas (e.g., the first antenna area 1251 and the second antenna area 1252) of the end part of the housing (e.g., the first housing 1210 and the second housing 1220) of the electronic device 101. According to an embodiment, at least one antenna is disposed toward the outside of the electronic device 101 and may comprise segmentation parts (e.g., a first antenna segment 1261 and a second antenna segment 1262) including a conductive material.

According to an embodiment, in the electronic device 101 of FIG. 12, a first antenna (not shown) may be located in the first antenna area 1251. A second antenna (not shown) may be located in the second antenna area 1252. The processor 120 may operate similarly to the operation of FIG. 11. For example, the electronic device 101 of FIG. 12 may be configured like a connection structure of a plurality of antennas illustrated in FIG. 10. For example, the first antenna 1001 of FIG. 10 may be located in the first antenna area 1251 of FIG. 12. In addition, the second antenna 1002 of FIG. 10 may be located in the second antenna area 1252 of FIG. 12.

For example, while identifying whether the electronic device 101 is gripped, based on a changed value of the first capacitance caused by the first antenna among the first antenna and the second antenna, processor 120 may identify that the state of electronic device 101 is switched from the first state (e.g., retracted state or slide-in state) to the second state (e.g., extended state or slide-out state). An operation of identifying that the state of the electronic device 101 is switched from the first state to the second state may correspond to operation 1110 of FIG. 11.

The processor 120 may obtain a changed value of the second capacitance caused by the second antenna among the first antenna and the second antenna through at least one grip sensor. An operation of the processor 120 to obtain a changed value of the second capacitance through at least one grip sensor may correspond to operation 1120 of FIG. 11.

The processor 120 may identify whether the electronic device 101 is gripped based on the changed value of the second capacitance. An operation of the processor 120 to identify whether the electronic device 101 is gripped based on a changed value of the second capacitance may correspond to operation 1130 of FIG. 11.

According to various embodiments, an electronic device (e.g., electronic device 101) may comprise a first antenna, a second antenna, a first capacitor connected to the first antenna, a second capacitor connected to the second antenna, a grip sensor connected to the first antenna through a first electrical path and connected to the second antenna through a second electrical path and at least one processor operably coupled to the grip sensor; wherein at least one processor may be configured to identify that a changed value of a first capacitance, caused by the first antenna, obtained through the grip sensor to identify whether the electronic device is gripped, is maintained within a specified range; based on identifying that the changed value of the first capacitance is maintained within the specified range, obtain, through the grip sensor, a changed value of the second capacitance, caused by the second antenna; and based on the changed value of the second capacitance, identify whether the electronic device is gripped.

According to an embodiment, the at least one processor may be further configured to identify, based on the changed value of the first capacitance being greater than or equal to a first threshold value, that a state of the electronic device is a first state in which the electronic device is gripped by a user, and identify, based on the changed value of the first capacitance being less than or equal to a second threshold value that is smaller than the first threshold value, that the state of the electronic device is changed from the first state to a second state that a grip of the user is released.

According to an embodiment, the at least one processor may be further configured to identify, based on the second capacitance being greater than or equal to a third threshold value, that the state of the electronic device is the first state, and identify, based on the changed value of the second capacitance being less than or equal to a fourth threshold value that is smaller than the third threshold value, that the state of the electronic device is changed from the first state to the second state.

According to an embodiment, the at least one processor may be further configured to perform a power back-off operation to reduce amount of transmit power and based on identifying that the state of the electronic device is changed from the first state to the second state, cease the power back-off operation.

According to an embodiment, the specified range may be set smaller than the first threshold value and greater than the second threshold value, and wherein the at least one processor may be configured to obtain, through the grip sensor, the changed value of the second capacitance based on identifying that the changed value of the first capacitance is maintained within the specified range for specified time.

According to an embodiment, the electronic device may further comprise a first switch for controlling the first electrical path, and a second switch for controlling the second electrical path, wherein the at least one processor may be configured to connect, via the second switch, the second antenna with the grip sensor by controlling the first switch and the second switch based on identifying that the changed value of the first capacitance is maintained within the specified range and obtain, through the grip sensor, the changed value of the second capacitance caused by the second antenna.

According to an embodiment, the at least one processor may be further configured to identify that a temperature of the electronic device is outside a reference temperature range based on identifying that the change value of the first capacitance is maintained within the specified range.

According to an embodiment, the at least one processor may be further configured to identify the changed value of the first capacitance while identifying, based on the changed value of the second capacitance, whether the electronic device is gripped, based on the changed value of the second capacitance, identify that the changed value of the first capacitance, which is identified while identifying whether the electronic device is gripped, is changed to a reference value, and based on the changed value of the first capacitance, identify whether the electronic device is gripped.

According to an embodiment, the at least one processor may be further configured to identify that the temperature of the electronic device is changed to within the reference temperature range, based on identifying that the changed value of the first capacitance is changed to the reference value.

According to an embodiment, the grip sensor may be connected to the first antenna through the first electrical path based on flexible printed circuit board type radio frequency cable (FRC).

According to an embodiment, a method of an electronic device may comprise identifying that a changed value of a first capacitance of a first capacitor connected with a first antenna, caused by a first antenna, connected with a grip sensor through the first electrical path, from among the first antenna and a second antenna connected with the grip sensor through a second electrical path, the changed value obtained through the grip sensor, is maintained within a specified range, based on identifying that the changed value of the first capacitance is maintained within the specified range, obtaining, through the grip sensor, a changed value of a second capacitance of a second capacitor connected with the second antenna, caused by the second antenna, and based on the changed value of the second capacitance, identifying whether the electronic device is gripped.

According to an embodiment, the method may further comprise identifying, based on the changed value of the first capacitance being greater than or equal to a first threshold value, that a state of the electronic device is a first state in which the electronic device is gripped by a user, and identifying, based on the changed value of the first capacitance being less than or equal to a second threshold value that is smaller than the first threshold value, that the state of the electronic device is changed from the first state to a second state that a grip of the user is released.

According to an embodiment, the method may further comprise identifying, based on the second capacitance being greater than or equal to a third threshold value, that the state of the electronic device is the first state, and identifying, based on the changed value of the second capacitance being less than or equal to a fourth threshold value that is smaller than the third threshold value, that the state of the electronic device is changed from the first state to the second state.

According to an embodiment, the method may further comprise performing a power back-off operation to reduce amount of transmit power and ceasing the power back-off operation based on identifying that the state of the electronic device is changed from the first state to the second state.

According to an embodiment, obtaining, through the grip sensor, the changed value of the second capacitance, based on identifying that the changed value of the first capacitance is maintained within the specified range may comprise based on identifying that the changed value of the first capacitance is maintained within the specified range, connecting the second antenna with the grip sensor by controlling a first switch for controlling the first electrical path and a second switch for controlling the second electrical path and obtaining, through the grip sensor, the changed value of the second capacitance caused by the second antenna According to an embodiment, the method may further comprise identifying that a temperature of the electronic device is outside a reference temperature range based on identifying that the change value of the first capacitance is maintained within the specified range.

According to an embodiment, the method may further comprise identifying the changed value of the first capacitance while identifying, based on the changed value of the second capacitance, whether the electronic device is gripped, based on the changed value of the second capacitance, identifying that the changed value of the first capacitance, which is identified while identifying whether the electronic device is gripped, is changed to a reference value, and based on the changed value of the first capacitance, identifying whether the electronic device is gripped.

According to an embodiment, the grip sensor may be connected to the first antenna through the first electrical path based on flexible printed circuit board type radio frequency cable (FRC).

According to various embodiments, an electronic device (e.g., electronic device 101) may comprise a first housing comprising a first surface, a second surface faced away from the first surface, a first side surface between the first surface and the second surface, and a second side surface between the first surface and the second surface; a second housing comprising a third surface, a fourth surface faced away from the third surface, a third side surface between the third surface and the fourth surface, and a fourth side surface between the third surface and the fourth surface; a third housing comprising a hinge structure rotatably connecting the first side surface of the first housing and the third side surface of the second housing faced to the first side surface of the first housing the first side surface of the first housing with respect to a folding axis of the hinge structure, a first antenna formed in at least part of the second side surface, a second antenna formed in at least part of the fourth side surface, a first capacitor connected with the first antenna; a second capacitor connected with the second antenna; at least one grip sensor; and at least one processor, operably coupled to the at least one grip sensor, wherein at least one processor may be configured to while identifying, based on a changed value of the first capacitance caused by the first antenna, whether the electronic device is gripped, identify that a state of the electronic device is switched from an unfolded state in which the first surface and the third surface form a flat surface to a folded state in which the first surface faces the third surface, based on identifying that the state of the electronic device is switched to the folded state, obtain through the at least one grip sensor, a changed value of a second capacitance caused by the second antenna and based on the changed value of the second capacitance, identify whether the electronic device is gripped.

According to an embodiment, the at least one grip sensor may comprise a first grip sensor and a second grip sensor, wherein the first grip sensor may be connected with the first antenna through a first electrical path, wherein the first grip sensor may be configured to identify whether the electronic device is gripped based on the changed value of the first capacitance, wherein the second grip sensor may be connected with the second antenna through a second electrical path, and wherein the second grip sensor may be configured to identify whether the electronic device is gripped based on the changed value of the second capacitance.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to,", "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may be interchangeably used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
    a first antenna;
    a second antenna;
    a first capacitor connected to the first antenna;
    a second capacitor connected to the second antenna;
    a grip sensor connected to the first antenna through a first electrical path and connected to the second antenna through a second electrical path; and
    at least one processor, operably coupled to the grip sensor, configured to:
        identify that a changed value of a first capacitance, caused by the first antenna, obtained through the grip sensor to identify whether the electronic device is gripped, is maintained within a specified range,
        based on identifying that the changed value of the first capacitance is maintained within the specified range, obtain, through the grip sensor, a changed value of the second capacitance, caused by the second antenna, and
        based on the changed value of the second capacitance, identify whether the electronic device is gripped.

2. The electronic device according to claim 1, wherein the at least one processor is further configured to:
    identify, based on the changed value of the first capacitance being greater than or equal to a first threshold value, that a state of the electronic device is a first state in which the electronic device is gripped by a user, and
    identify, based on the changed value of the first capacitance being less than or equal to a second threshold value that is smaller than the first threshold value, that the state of the electronic device is changed from the first state to a second state that a grip of the user is released.

3. The electronic device according to claim 2, wherein the at least one processor is further configured to:
    identify, based on the second capacitance being greater than or equal to a third threshold value, that the state of the electronic device is the first state, and
    identify, based on the changed value of the second capacitance being less than or equal to a fourth threshold value that is smaller than the third threshold value, that the state of the electronic device is changed from the first state to the second state.

4. The electronic device according to claim 3, wherein the at least one processor is further configured to:
    perform a power back-off operation to reduce amount of transmit power, and
    based on identifying that the state of the electronic device is changed from the first state to the second state, cease the power back-off operation.

5. The electronic device according to claim 2, wherein the specified range is set smaller than the first threshold value and greater than the second threshold value, and
    wherein the at least one processor is configured to obtain, through the grip sensor, the changed value of the second capacitance based on identifying that the changed value of the first capacitance is maintained within the specified range for specified time.

6. The electronic device according to claim 1, further comprising:
    a first switch for controlling the first electrical path; and
    a second switch for controlling the second electrical path,
    wherein the at least one processor is configured to:
        based on identifying that the changed value of the first capacitance is maintained within the specified range, connect, via the second switch, the second antenna with the grip sensor by controlling the first switch and the second switch, and
        obtain, through the grip sensor, the changed value of the second capacitance caused by the second antenna.

7. The electronic device according to claim 1, wherein the at least one processor is further configured to identify that a temperature of the electronic device is outside a reference temperature range based on identifying that the changed value of the first capacitance is maintained within the specified range.

8. The electronic device according to claim 7, wherein the at least one processor is further configured to:
    identify the changed value of the first capacitance while identifying, based on the changed value of the second capacitance, whether the electronic device is gripped,
    based on the changed value of the second capacitance, identify that the changed value of the first capacitance, which is identified while identifying whether the electronic device is gripped, is changed to a reference value, and
    based on the changed value of the first capacitance, identify whether the electronic device is gripped.

9. The electronic device according to claim 8, wherein the at least one processor is further configured to identify that the temperature of the electronic device is changed to within the reference temperature range, based on identifying that the changed value of the first capacitance is changed to the reference value.

10. The electronic device according to claim 1, wherein the grip sensor is connected to the first antenna through the first electrical path based on flexible printed circuit board type radio frequency cable (FRC).

11. A method of an electronic device comprising:
identifying that a changed value of a first capacitance of a first capacitor connected with a first antenna, caused by a first antenna connected with a grip sensor through a first electrical path, from among the first antenna and a second antenna connected with the grip sensor through a second electrical path, the changed value obtained through the grip sensor, is maintained within a specified range;
based on identifying that the changed value of the first capacitance is maintained within the specified range, obtaining, through the grip sensor, a changed value of a second capacitance of a second capacitor connected with the second antenna, caused by the second antenna; and
based on the changed value of the second capacitance, identifying whether the electronic device is gripped.

12. The method according to claim 11, further comprising:
identifying, based on the changed value of the first capacitance being greater than or equal to a first threshold value, that a state of the electronic device is a first state in which the electronic device is gripped by a user; and
identifying, based on the changed value of the first capacitance being less than or equal to a second threshold value that is smaller than the first threshold value, that the state of the electronic device is changed from the first state to a second state that a grip of the user is released.

13. The method according to claim 12, further comprising:
identifying, based on the second capacitance being greater than or equal to a third threshold value, that the state of the electronic device is the first state; and
identifying, based on the changed value of the second capacitance being less than or equal to a fourth threshold value that is smaller than the third threshold value, that the state of the electronic device is changed from the first state to the second state.

14. The method according to claim 13, further comprising:
performing a power back-off operation to reduce amount of transmit power; and
based on identifying that the state of the electronic device is changed from the first state to the second state, ceasing the power back-off operation.

15. The method according to claim 11, wherein obtaining, through the grip sensor, the changed value of the second capacitance based on identifying that the changed value of the first capacitance is maintained within the specified range comprises:
based on identifying that the changed value of the first capacitance is maintained within the specified range, connecting the second antenna with the grip sensor by controlling a first switch for controlling the first electrical path and a second switch for controlling the second electrical path; and
obtaining, through the grip sensor, the changed value of the second capacitance caused by the second antenna.

16. The method according to claim 11, further comprising:
identifying that a temperature of the electronic device is outside a reference temperature range based on identifying that the change value of the first capacitance is maintained within the specified range.

17. The method according to claim 16, further comprising:
identifying the changed value of the first capacitance while identifying, based on the changed value of the second capacitance, whether the electronic device is gripped;
based on the changed value of the second capacitance, identifying that the changed value of the first capacitance, which is identified while identifying whether the electronic device is gripped, is changed to a reference value; and
based on the changed value of the first capacitance, identifying whether the electronic device is gripped.

18. The method according to claim 11, wherein the grip sensor is connected to the first antenna through the first electrical path based on flexible printed circuit board type radio frequency cable (FRC).

19. An electronic device comprising:
a first housing comprising a first surface, a second surface faced away from the first surface, a first side surface between the first surface and the second surface, and a second side surface between the first surface and the second surface;
a second housing comprising a third surface, a fourth surface faced away from the third surface, a third side surface between the third surface and the fourth surface, and a fourth side surface between the third surface and the fourth surface;
a third housing comprising a hinge structure rotatably connecting the side first surface of the first housing and the third side surface of the second housing faced to the first side surface of the first housing with respect to a folding axis of the hinge structure;
a first antenna formed in at least part of the second side surface;
a second antenna formed in at least part of the fourth side surface;
a first capacitor connected with the first antenna;
a second capacitor connected with the second antenna;
at least one grip sensor; and
at least one processor, operably coupled to the at least one grip sensor, configured to:
while identifying, based on a changed value of the first capacitance caused by the first antenna, whether the electronic device is gripped, identify that a state of the electronic device is switched from an unfolded state in which the first surface and the third surface form a flat surface to a folded state in which the first surface faces the third surface,
based on identifying that the state of the electronic device is switched to the folded state, obtain through the at least one grip sensor, a changed value of a second capacitance caused by the second antenna, and
based on the changed value of the second capacitance, identify whether the electronic device is gripped.

20. The electronic device according to claim 19,
wherein the at least one grip sensor comprises a first grip sensor and a second grip sensor,
wherein the first grip sensor is connected with the first antenna through a first electrical path,
wherein the first grip sensor is configured to identify whether the electronic device is gripped based on the changed value of the first capacitance,
wherein the second grip sensor is connected with the second antenna through a second electrical path, and wherein the second grip sensor is configured to identify whether the electronic device is gripped based on the changed value of the second capacitance.

\* \* \* \* \*